United States Patent [19]

Onda et al.

[11] Patent Number: 5,860,067
[45] Date of Patent: Jan. 12, 1999

[54] USER INTERFACE SCHEDULING SYSTEM WITH TIME SEGMENT CREATION AND SELECTION

[75] Inventors: Kiyosumi Onda; Takao Tanabe; Norio Fujita; Yuichi Koizumi, all of Tokyo, Japan

[73] Assignee: Mitsubishi Denki Kabushiki Kaisha, Tokyo, Japan

[21] Appl. No.: 946,463

[22] Filed: Oct. 7, 1997

Related U.S. Application Data

[63] Continuation of Ser. No. 247,773, May 23, 1994, abandoned.

[30] Foreign Application Priority Data

Jun. 1, 1993 [JP] Japan ................................. 5-130725

[51] Int. Cl.⁶ .................................................... G06F 3/00
[52] U.S. Cl. ............................. 705/9; 345/341; 345/349; 345/963
[58] Field of Search .................................. 345/326–358, 345/963; 705/8–9; 368/1, 10, 327, 62

[56] References Cited

U.S. PATENT DOCUMENTS

| | | | |
|---|---|---|---|
| 4,428,065 | 1/1984 | Duvall et al. | 395/157 X |
| 4,710,762 | 12/1987 | Yamada | 345/185 |
| 4,807,155 | 2/1989 | Cree et al. | 395/161 X |
| 4,823,303 | 4/1989 | Terasawa | 395/157 |
| 4,937,743 | 6/1990 | Rassman et al. | 364/401 R |
| 5,016,170 | 5/1991 | Pollalis et al. | 395/161 X |
| 5,023,851 | 6/1991 | Murray et al. | 395/161 |
| 5,025,382 | 6/1991 | Artz | 364/157 |
| 5,111,391 | 5/1992 | Fields et al. | 364/401 |
| 5,196,838 | 3/1993 | Meier et al. | 395/157 X |
| 5,208,588 | 5/1993 | Nishiyama | 395/123 |
| 5,323,314 | 6/1994 | Baber et al. | 395/155 X |
| 5,334,997 | 8/1994 | Scallon | 345/167 |
| 5,365,360 | 11/1994 | Torres | 395/159 |
| 5,375,199 | 12/1994 | Harrow et al. | 395/157 X |
| 5,428,736 | 6/1995 | Kahl et al. | 395/159 |
| 5,440,681 | 8/1995 | Kudo | 395/161 |
| 5,500,938 | 3/1996 | Cahill et al. | 395/161 |
| 5,519,606 | 5/1996 | Frid-Nielsen et al. | 364/401 R |
| 5,519,828 | 5/1996 | Rayner | 395/161 |

FOREIGN PATENT DOCUMENTS

| | | | |
|---|---|---|---|
| 0094494 | 11/1983 | European Pat. Off. | G06F 15/20 |
| 0156116 | 10/1985 | European Pat. Off. | G09G 1/00 |
| 0216063 | 4/1987 | European Pat. Off. | G06F 15/20 |
| 0302498 | 2/1989 | European Pat. Off. | G06K 11/00 |
| 0603425 | 6/1994 | European Pat. Off. | G09G 5/00 |
| 62-73327 | 4/1987 | Japan | G06F 3/153 |
| 63-255727 | 10/1988 | Japan | G06F 3/06 |
| 63-262754 | 10/1988 | Japan | G06F 15/02 |
| 63-282875 | 11/1988 | Japan | G06F 15/20 |

(List continued on next page.)

*Primary Examiner*—John E. Breene
*Attorney, Agent, or Firm*—Wolf, Greenfield & Sacks P.C.

[57] ABSTRACT

The user interface system provides the input means for inputting a segment by pointing out an arbitrary position of the display screen with the input unit such as a mouse for pointing out arbitrary positions of the display screen. The segment has a position and a length to indicate hours or days. The segment editor displays the segment according to the length which is designated by the input unit such as a mouse. The database entry stores the data indicated by the position and the length of the segment as entered data.

Thus, data is entered by inputting a segment. Therefore, data such as a time and a date are not needed to be entered from a keyboard. Since data entry is made by drawing a segment by using a mouse, operation is easy. Furthermore, since the length of the segment shows the hours or period visually to a system operator, the chances of errors are lessened.

The user interface system provides a system to input additional information for a segment displayed by the segment editor. Consequently, detailed information which cannot be displayed merely by the segment is coped with in case such detailed information exists.

26 Claims, 35 Drawing Sheets

FOREIGN PATENT DOCUMENTS

| | | | |
|---|---|---|---|
| 1-298466 | 12/1989 | Japan | G06F 15/21 |
| 2-96824 | 4/1990 | Japan | G06F 3/02 |
| 2-126313 | 5/1990 | Japan | G06F 3/03 |
| 2-181267 | 7/1990 | Japan | G06F 15/21 |
| 2-236666 | 9/1990 | Japan | G06F 15/30 |
| 2-275524 | 11/1990 | Japan | G06F 3/14 |
| 3-220618 | 9/1991 | Japan | G06F 3/03 |
| 4-37945 | 2/1992 | Japan | G06F 15/02 |
| 4-54630 | 2/1992 | Japan | G06F 3/14 |
| 4-159064 | 6/1992 | Japan | G06F 15/21 |
| 5-20001 | 1/1993 | Japan | G06F 3/14 |
| 5-73205 | 3/1993 | Japan | G06F 3/033 |
| 2137788 | 10/1984 | United Kingdom | G09G 3/36 |
| 2156118 | 10/1985 | United Kingdom | G09G 3/00 |
| 2177245 | 1/1987 | United Kingdom | G09G 1/00 |
| 2192297 | 1/1988 | United Kingdom | G06F 3/00 |
| 2193827 | 2/1988 | United Kingdom | G06F 3/033 |
| 2199169 | 6/1988 | United Kingdom | G06K 9/22 |
| 2218232 | 11/1989 | United Kingdom | G09F 9/00 |
| 2224380 | 5/1990 | United Kingdom | G06F 15/21 |
| 2234609 | 2/1991 | United Kingdom | H03M 7/30 |
| WO88/02152 | 3/1988 | WIPO | G06F 15/21 |

FIG. 7

[Studio Schedule Group A interface with Segment Detail Screen]

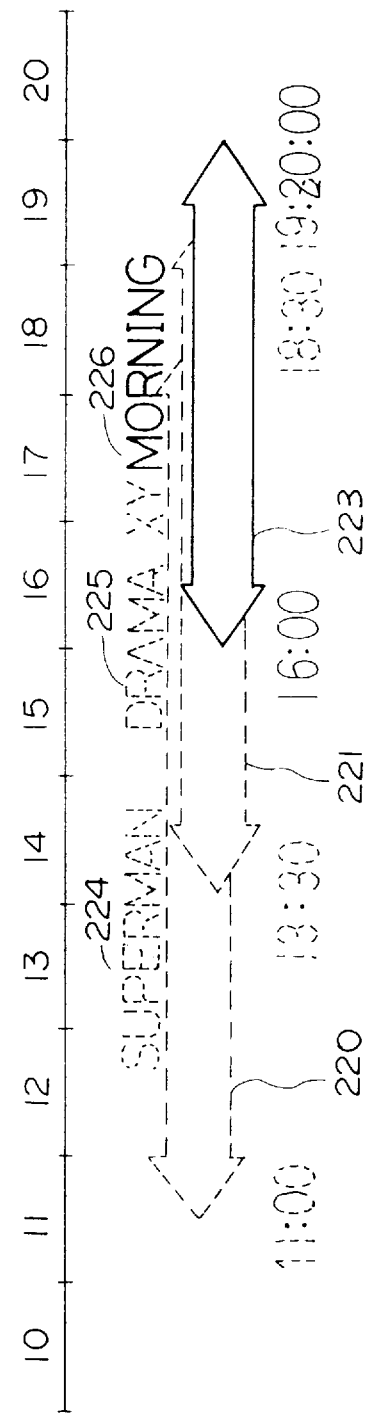
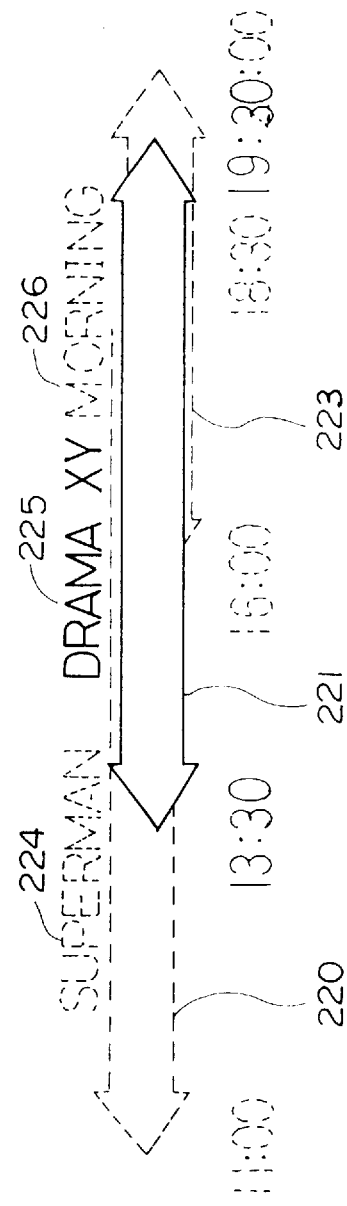
FIG. 8(a)
FIG. 8(b)

MULTI-ROW DISPLAY (A ROW IN UPPER CHART IS EXPANDED TO THREE ROWS IN LOWER CHART.)

VERTICAL SEGMENT DISPLAY

FIG. 12   VERTICAL SEGMENT DISPLAY THREE CHARTS SCROLLS SYNCHRONOUSLY BY SLIDING ONE OF SCROLL BARS DISPLAYED AT THE BOTTOM OF THE CHARTS.

MONTHLY CHART — DAILY CHART

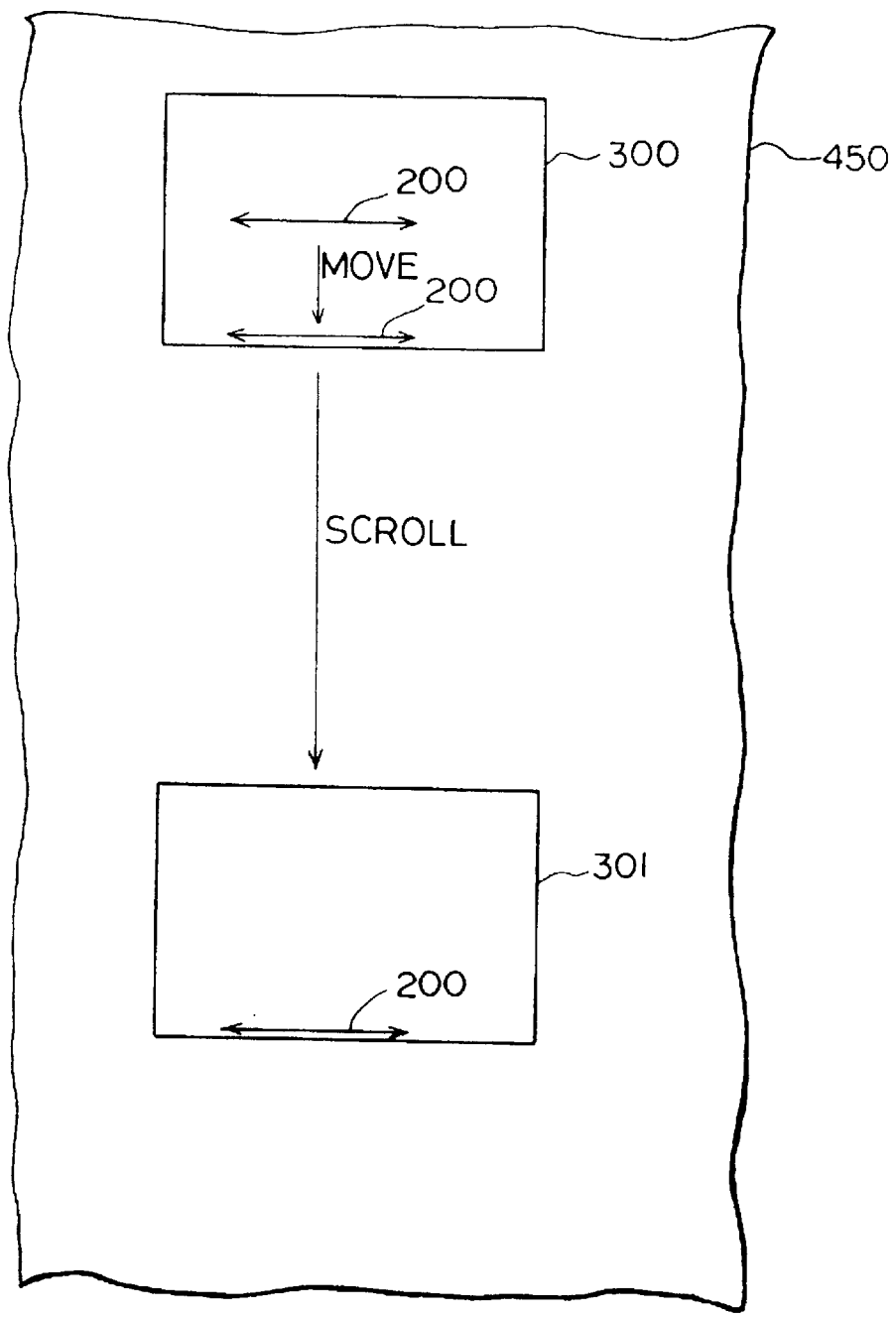

FIG. 21(a)
DEAR OLD MUSIC
FIG. 21(b)
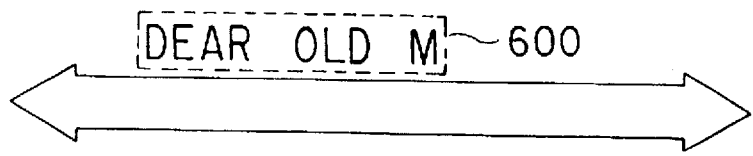
FIG. 21(c)
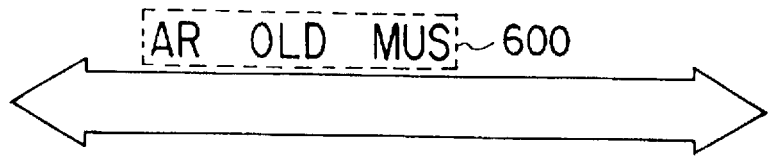
FIG. 21(d)
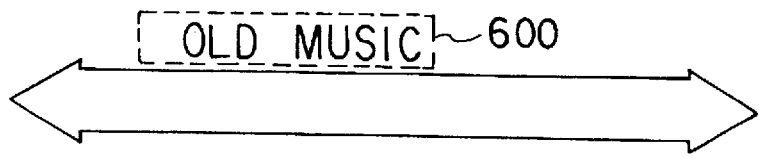

FIG. 22(a)  YAMADA  SUZUKI  KAWAGUCH  YOSHIDA

FIG. 23

MULTI-SEGMENT MOVEMENT

| SEG. MOV. | WORK SCHEDULE | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| 1993/04/23 (FRI) <B> | | | | | | | | TODAY | | | | | | | | | | | | | | | | | | | | | |
| | 5 | 6 | 7 | 8 | 9 | 10 | 11 | 12 | 13 | 14 | 15 | 16 | 17 | 18 | 19 | 20 | 21 | 22 | 23 | 0 | 1 | 2 | 3 | 4 | 5 | 6 | 7 | 8 |
| A COMMENT | | | | | | | | | | | | | | | | →200 | | | | | | | | | | | | |
| B COMMENT | | | | | | SERVICE 10:00 | | | | | | | | 18:30 →201 | | | | | | ADD. HOL. | | 23:59 | | | | | | |
| C COMMENT | | | | | | EDITOR DESK 10:00 | | | | | | | | 18:30 →202 | | | | | | ADD. HOL. | | 23:59 | | | | | | |
| D COMMENT | | | | | | EDITOR DESK 10:00 | | | | | | | | 18:30 →203 | | | | | | | | | | | | | | |
| E COMMENT | | | | | | EDITOR DESK 10:00 | | | | | | | | 18:30 →204 | | | | | | ADD. HOL. | | 23:59 | | | | | | |
| F COMMENT | | | | | | SERVICE DESK 10:00 | | | | | | | | 18:30 →205 | | | | | | | | | | | | | | |
| G COMMENT | | | | | | | | | | | | | | →206 | | | | | | | | | | | | | | |

FIG. 24(a)  (a): ROW EXCHANGING

FIG. 24(b)  (b): RESULT OF ROW EXCHANGE

FIG. 25

WORKER CANDIDATES SELECTION

| SING. SEG. | SCHEDULE |
|---|---|
| 1993/04/23 (FRI) <B> | TODAY |

Time columns: 0 1 2 3 4 5 6 7 8 9 10 11 12 13 14 15 16 17 18 19 20 21 22 23 0 1 2 3 4

ST101 ∨ — 200 — 10:00  12:30

ST102 ∨

ST111 ∨

300

301 — INPUT OPTION SCREEN

SEARCHING: REQUEST ±1 HOUR

| GROUP NAME | REG. TIME | END TIME | WORK |
|---|---|---|---|
| PREV MENU | | | |
| GROUP A  AKIYAMA | 10:00 | 18:30 | |
| GROUP A  YAMADA | 10:00 | 18:30 | |

PREP.    NXT.P

WORK ENTRY
(CONTINUOUS WORK ENTRY FOR 4 WORKERS)

FIG. 27

CONTINUOUS WORK EDITING
"MASUI MAINT." IS KEPT IN "WK. COMM."
FOR NEXT SCREEN AFTER ENTRY OF
"WK. COMM."

FIG. 28
CONTINUOUS WORK ENTRY
SAME COMMENT IS KEPT IN "WK. COMM." FOR NEXT SCREEN.

FIG. 33

37" LARGE DISPLAY IS OPERATED BY FOOT MOUSE.
THE DISPLAY SHOWS ONE WEEK SCHEDULE PER PERSON.

| YAMADA | 0 | 12 | 24 |
|---|---|---|---|
| 1992/12/10(WED)A | | | |
| 1992/12/11(THU)A | | ←→ | |
| 1992/12/12(FRI)A | | ←→ | |
| 1992/12/13(SAT)A | ←——→ | | |
| 1992/12/14(SUN)B | ←——→ | | |
| 1992/12/15(MON)B | | ←→ | |
| 1992/12/16(TUE)B | | ←→ | |

37 INCH DISPLAY

USER INTERFACE SCHEDULING SYSTEM WITH TIME SEGMENT CREATION AND SELECTION

This application is a continuation, of application Ser. No. 08/247,773, filed May 23, 1994 now abandoned.

BACKGROUND OF THE INVENTION

1. Field of the Invention

This invention relates to a user interface system with an innovative man-machine interface realized by the usage of segments for input, edit and display.

2. Description of the Related Art

Conventionally, a keyboard is used to input figures and letters into a computer system, when data are input, displayed and edited.

For example, when personal data are to be stored in a personal master, normally a system displays a input field for each data on the screen at first. Then, corresponding figures and letters are input in each field. Attributes such as ID No., name, age, sex, address, telephone No., group, etc. are displayed on a screen and each corresponding data for each person must be input in the field one by one.

When the personal data are to be updated, data have to be retrieved to be displayed on the screen at first. Then, the data have to be replaced with new figures and letters also by keyboard operation. Naturally, when the data are displayed and printed, the figures and letters which are previously input come out.

As has been described, a keyboard is commonly used for data entry in computer.

A keyboard is also used to input figures and letters into a computer system in order to enter data for schedule control, work plan and resources allotment.

In many occasions, such data often relate to time. Some data occur chronologically and some others have deadlines. Input of date and time may not be omitted when the computer system is used for production process control and work control. Especially, in production process control in manufacturing, period and/or date of deadline for each process must be always input.

However, when a keyboard is used to enter either date or time, four to six digits figures have to be input to specify the data. When the keyboard is used to enter both date and time, even eight to ten digits figures have to input to specify the data.

Also known is a window system which works under an operating system to display windows on a screen. This window system provides a desk top environment for an operator.

The window system has the following advantages:

can display plural windows which show different information on a screen at the same time;

allows switching of windows to select an active window for optimum handling, and provides a "cut-and-paste" function to copy or move data among windows.

When data is copied among windows, duplicate data of the original data in the original window are created and saved in other windows.

For example, when a word processing application program and a spread sheet program are operated in two different windows on a screen, specific field data in the spread sheet are able to be designated and copied to an arbitrary area in a document prepared by a word processor program. This copy operation is to duplicate and insert the designated data in the spread sheet to the work processing document. So, data are held in duplicate in the spread sheet and the word processor documents and both data are independently saved. Therefore, when data in a window is updated, the data in another window is not updated simultaneously.

Another advantage of the window system is an ability to scroll and divide the windows to display the data flexibly.

When data are too large, the size of the windows generated on the screen can be often too small to display all the data. That is because the windows can display only a part of the data. In such a case, scrolling of the window is necessary to show a desired data in the window.

To avoid scrolling, an window can be divided either horizontally and vertically. For example, when two sets of data are located too far apart vertically to compare, a window may be divided in up-and-down to display the first set of data in the upper area of the window and the second set of data in the lower area. By doing so, both sets of data can be monitored in the same window. In the same way, when the data are located too far apart horizontally, a window may be divided in a side-by-side manner to display both data at the same time.

As has been described, conventionally a keyboard is used for the input of figures and letters for data entry to a computer. However, it has the following disadvantages:

(1) Operation with a keyboard is inevitable to input figures and letters;

(2) Input of figures and letters easily result in errors and the system must provide enough check systems to detect such errors, and (3) When the above input data are displayed, the figures and letters are displayed as they are. Therefore, it is a requirement for the users to read and recognize the displayed figures and letters in order to comprehend the meaning of the data.

Especially, when the data have a range such as length, size, period, etc., an actual range must be recognized by comprehending the displayed figures. In this way, usage of figures and letters for input and display of the data with range and period has been causing inconvenience.

In order to solve the above-mentioned problems, "a schedule planning support method or device" which is shown in published unexamined patent gazette Hei 4-159064 is proposed for example. The "schedule planning support method or device" supports drawing of a schedule planning chart by displaying a schedule chart on a display screen.

As shown in FIG. 37, a schedule chart is displayed on a display screen. A beginning point 402 and an ending point 403 are assigned, and a segment 404 which connects the beginning point 402 and the ending point 403 is displayed to support scheduling of a displayed item. The segment is used to make a schedule, the schedule may be obtained visually. Hence, an advantage is that setting and updating of a plan may be done easily.

However, in this method, only scheduling of the item is conducted and additional required information is unable to be input while scheduling the item. For instance, when required resources such as equipments and staff, etc. must be allocated for the execution of a plan based on a work plan, the equipments and staff which are necessary for the execution of the plan must be input and stored as additional information for the work plan. The described method to input a segment in order to make a schedule of the item is too simple to control the schedule for the complex work plan.

As described earlier, the window system according to the prior art has the following disadvantages:

(1) Scrolling of a window is necessary to show a desired data, as only a limited area of the data may be displayed, since the window displays only part of the data, the data outside the display range of the window can never be seen at the same time;

(2) Even though display of multiple windows and exchange of data among windows is possible, handling of the data is complex, since the data is created in duplicate in each window, and (3) Even though displays of multiple windows is possible, they can never show the data with different units or aspects.

In general, data should be able to be utilized in more than one perspective. In some case, data are needed to be prepared with different time scales. For example, both daily and monthly schedules are required to be monitored. Same data are needed to be monitored in different perspectives such as days and months. In other cases, both assigned equipments and persons for the schedule should be monitored by using the same original data. However, conventional art has been unable to offer such information in different units or aspects effectively.

SUMMARY OF THE INVENTION

Accordingly, it is an object of this invention to solve the above mentioned problems in the computer system.

It is another object of this invention to offer an efficient user interface system for inputting, editing and displaying data.

It is another object of this invention to offer an effective user interface system for displaying and editing in a window under the window system.

It is another object of this invention to offer an effective user interface system for displaying and editing among windows under the window system.

A user interface system, according to one aspect of the present invention, for entering data into a database, which has a display screen for displaying information and an input unit for inputting data, the user interface system comprises:

input means for designating positions on the display screen with the input unit;

a segment editor for displaying a segment, having two ends, on the display screen at the designated positions; and database entry means for entering data into the database corresponding to the displayed segment, for selecting the segment with the input unit and for entering additional information with the input unit for the selected segment.

The segment editor includes segment edit means for editing the displayed segment, and the database entry means includes database maintenance means for updating data stored in the database to reflect the editing by the segment edit means.

The database entry means stores data corresponding to the two ends of the segment into the database.

The segment editor further includes resource display means for displaying a resource, scale means for displaying a scale for scheduling of the resource, and the input means assigns a section to the resource, the segment editor displays the segment as the scheduled section of the resource, and the database entry means stores the scheduled section of the resource.

The segment editor includes value display means for displaying values, which correspond to the ends of the segment, at the ends of the displayed segment.

The value display means displays the value corresponding to the end of the segment even when the end of the segment is not displayed on the display screen.

The database entry means further comprises:

selecting means for selecting the displayed segment with the input unit;

window means for displaying a data entry window which has an entry field for entering additional information; and entry means for entering the additional information into the entry field.

The entry means comprises candidate select means for displaying a list of posssible candidates to be entered in the entry field, and for selecting a candidate from the list.

The segment edit means includes duplicating means for duplicating the segment and for placing a duplicated segment at another position and the database maintenance means includes copy means for copying the additional information in the database.

The entry means includes default means for l displaying a previously entered information in the entry field as a default.

The database entry means provides an editing window having an edit field, displays information in the edit field and allows for editing of the information displayed in the edit field.

The segment editor includes information display means for displaying information along the displayed segment.

The segment editor includes style means for displaying the segment in a different style to reflect a sufficiency of the information needed for the segment.

The resource is selected from a list of a place, an equipment and a human.

The segment editor includes check means for checking that the section is consistent with a schedule of the resource already stored in the database, and for prohibiting display of the segment and entry of the data into the database when there is an inconsistency between the section assigned and the schedule already stored.

The segment editor includes display control means for distinguishably displaying segments when the segments are at least partially overlapped on the display screen with respect to each other.

The display control means includes color display means for displaying the segment in color, and color change means for changing the color of the segment to distinguish the segments.

The display control means includes position change means for changing a position of the segments to distinguish the segments.

The position change means includes shift display means for shifting the position of the segment to distinguish the two ends of the segment.

The position change means includes divisional display means for providing a plurality of divisional areas on the screen and for displaying at least a portion of each segment within at least one of the divisional areas.

The segment editor includes connector display means for displaying a connector for coupling the ends of a plurality of related segments so that the segment edit means does not edit the related segments.

The segment editor includes moving means for selecting and moving the segment in a desired direction, with the input unit, detect means for detecting the direction of the movement of the segment, and scroll means for scrolling the information along the moving direction.

The segment editor includes:

(a) display means for providing a plurality of areas on the display screen and displaying a segment in each of the provided areas; and (b) exchange means for exchanging the segment displayed in one area with the segment displayed in another area.

The input unit includes foot operation means for operating the input unit with a foot of an operator; and the display screen includes means for displaying information provided by the input unit.

A user interface system, according to one aspect of the present invention, which has a display screen for displaying information, comprises:

(a) window display means for displaying a window on the display screen;

(b) divide means for dividing the window horizontally into a plurality of side-by-side windows; and (c) vertical display means for dividing and displaying information in each of the side-by-side windows.

The vertical display means includes horizontal scroll means for horizontally scrolling the information in each of the side-by-side windows synchronously, and vertical scroll means for vertically scrolling the information in each of the side-by-side windows independently.

A user interface system, according to one aspect of the present invention, which has a display screen for displaying information, comprises:

(a) window display means for displaying a window on the display screen;

(b) divide means for dividing the window into a plurality of up-and-down windows; and (c) horizontal display means for dividing and displaying the information in each of the up-and-down windows.

The horizontal display means includes horizontal scroll means for horizontally scrolling the information in the up-and-down windows synchronously, and vertical scroll means for vertically scrolling the information in the up-and-down windows independently.

A user interface system, according to one aspect of the present invention, which has a display screen for displaying information, comprise:

(a) first display means for providing a first window for displaying information with a first scale and for also displaying information which is not subject to the scale; and (b) second display means for providing a second window to display the information in the first window with a second scale which is different from the first scale, and for displaying the information not subject to the scale at a same size as in the first window.

A user interface system, according to one aspect of the present invention, which has a display screen for displaying information, comprises:

(a) first display means for providing a first window to display information with a first time scale; and (b) second display means for providing a second window to display information with a second time scale which is different from the first time scale, and the information displayed by the fist display means is displayed in the second window with the second time scale.

The user interface system further comprises:

scroll means for synchronously scrolling the information displayed in the first and second windows.

The user interface system further comprises:

editing means for editing the information displayed in the window; and, synchronized update means for synchronously updating the information displayed in the windows.

The user interface system further comprises:

a segment editor for displaying a segment in one of the windows and for duplicating the segment from one window to another window.

A user interface system, according to one aspect of the present invention, which has a display screen comprises:

(a) display means for providing a number of display fields on the display screen wherein each field is capable of displaying a limited number of charactrers;

(b) inter-field scroll means for scrolling a plurality of characters between the number of fields such that the plurality of characters are displayed by the number of fields.

An item to be displayed has a first number of characters, and the number of fields have a total number of characters less than the first number of characters. Further, intrafield scroll means scrolls the first number of characters between the number of fields.

The segment editor includes multi-moving means for designating a plurality of segments and synchronously moving the designated segments together to other positions.

A user interface system, according to one aspect of the present invention, for selecting an optimal resource from a database, comprises:

(a) memory means for storing identification data and corresponding image data of a plurality of resources;

(b) listing means for displaying a list of the identification data;

(c) media means for selecting the identification data from the list and for outputting the image data corresponding to the selected identification data;

(d) select means for selecting a resource from the plurality of resources.

A user interface system, according to one aspect of the present invention, for selecting an optimal resource from a database, comprising:

(a) memory means for storing identification data and corresponding voice data of a plurality of resources;

(b) listing means for displaying a list of the identification data;

(c) voice means for selecting the identification data from the list and for outputting the voice data corresponding to the selected identification data;

(d) select means for selecting a resource from the plurality of resources.

A resource scheduling method, according to one aspect of the present invention, for scheduling a resource, comprises the steps of:

(a) displaying a resource and a time scale on a display screen;

(b) profiding information for indicating a period assigned to the resource, by selecting start and ends points the time scale;

(c) storing the resource and the information as an assigned schedule; and (d) supplementing the schedule with additional information to complete the scheduling of the resource.

A user interface system, according to one aspect of the present invention, which has a standard operation process, comprises:

(a) ID input means for inputting an identifier of an operator;

(b) learning means for learning a hierarchial path chosen by an opoerator corresponding to the identifier; and (c) process change means, upon providing the identifier to the system, for placing the display in the learned hierarchial path.

A user interface system, according to one aspect of the present invention, which has a display screen for displaying information and an input unit for pointing out arbitrary positions of the display screen, comprises:

(a) display means for displaying a cursor position of the input unit on the display screen;

(b) menu means for displaying a pop-up menu at the cursor position; and (c) select means for selecting an item in the pop-up menu.

The input unit is a mouse having a button for clicking, the menu means includes means for displaying the pop-up menu upon a first click of the button and for continuously displaying the pop-up menu after release of the button, select means includes means for dragging the mouse without holding down the button, and for selecting an item in the pop-up menu by a second click of the button.

BRIEF EXPLANATION OF THE DRAWINGS

In the drawings.

FIG. 7 shows a chart explaining a segment and a segment detail screen in an embodiment of this invention;

FIG. 8(a)–8(b) illustrate the overlapped segments in an embodiment of this invention;

FIG. 19 shows a chart explaining a scroll of a window in an embodiment of this invention;

FIG. 21(a)–21(d) show a chart explaining a scroll of character data in an embodiment of this invention;

FIG. 22(a)–22(h) show a chart explaining a scroll of character data in an embodiment of this invention;

FIG. 23 shows a batch-moving of segments in an embodiment of this invention;

FIG. 24(a)–24(b) show an exchange of rows in an embodiment of this invention;

FIG. 25 shows an input candidates selection in an embodiment of this invention;

FIG. 27 shows a continuous editing of work in an embodiment of this invention;

FIG. 28 shows a continuous input of work in an embodiment of this invention;

FIG. 33 shows an example display of a large display screen in an embodiment of this invention;

Figures 37A, 37B, 37C:
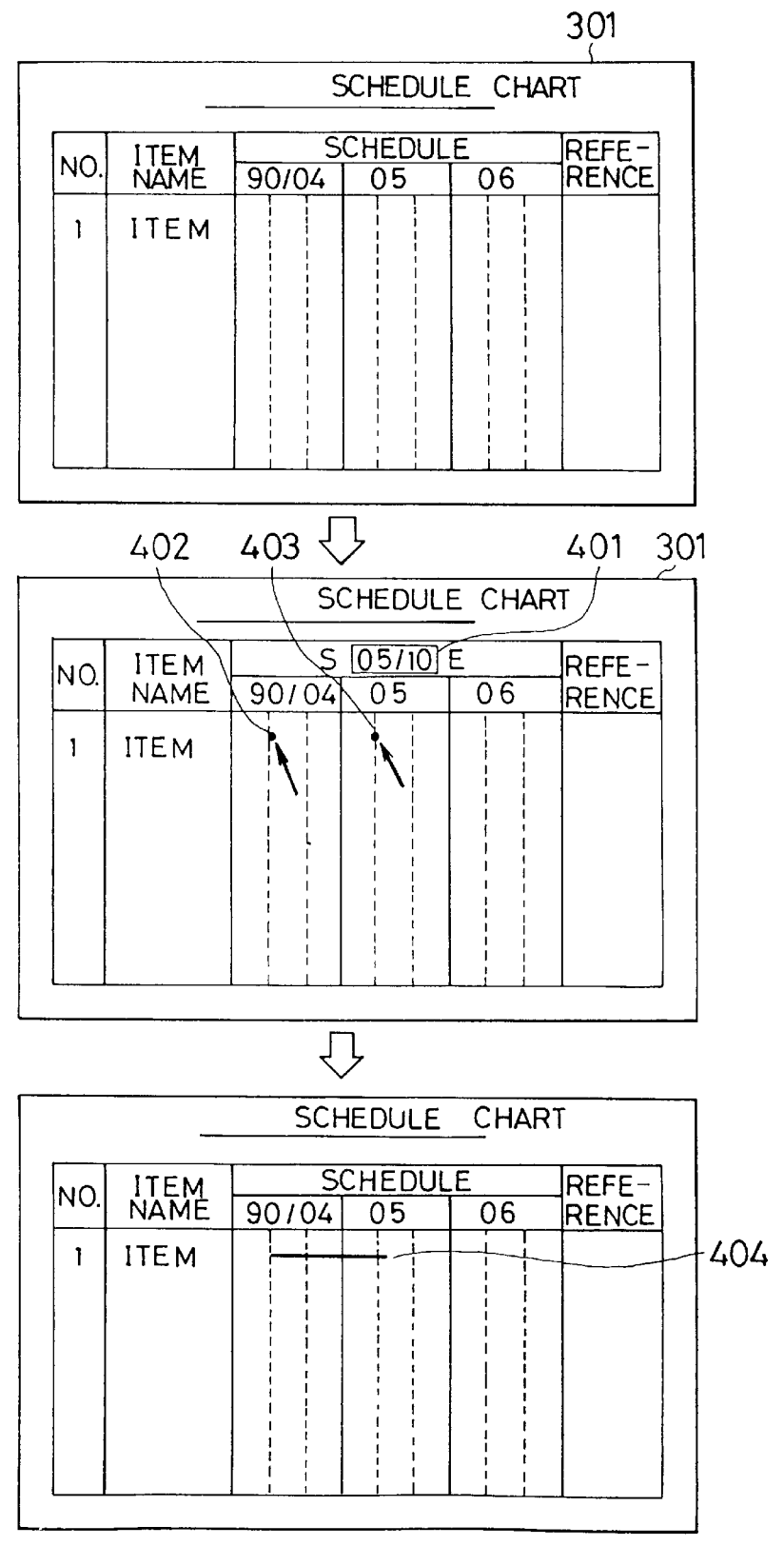

FIG. 37(a)–37(c) show a display of a schedule chart in an embodiment of this invention.

DESCRIPTION OF THE PREFERRED EMBODIMENTS

Embodiments

Embodiment 1.

Figure 1:
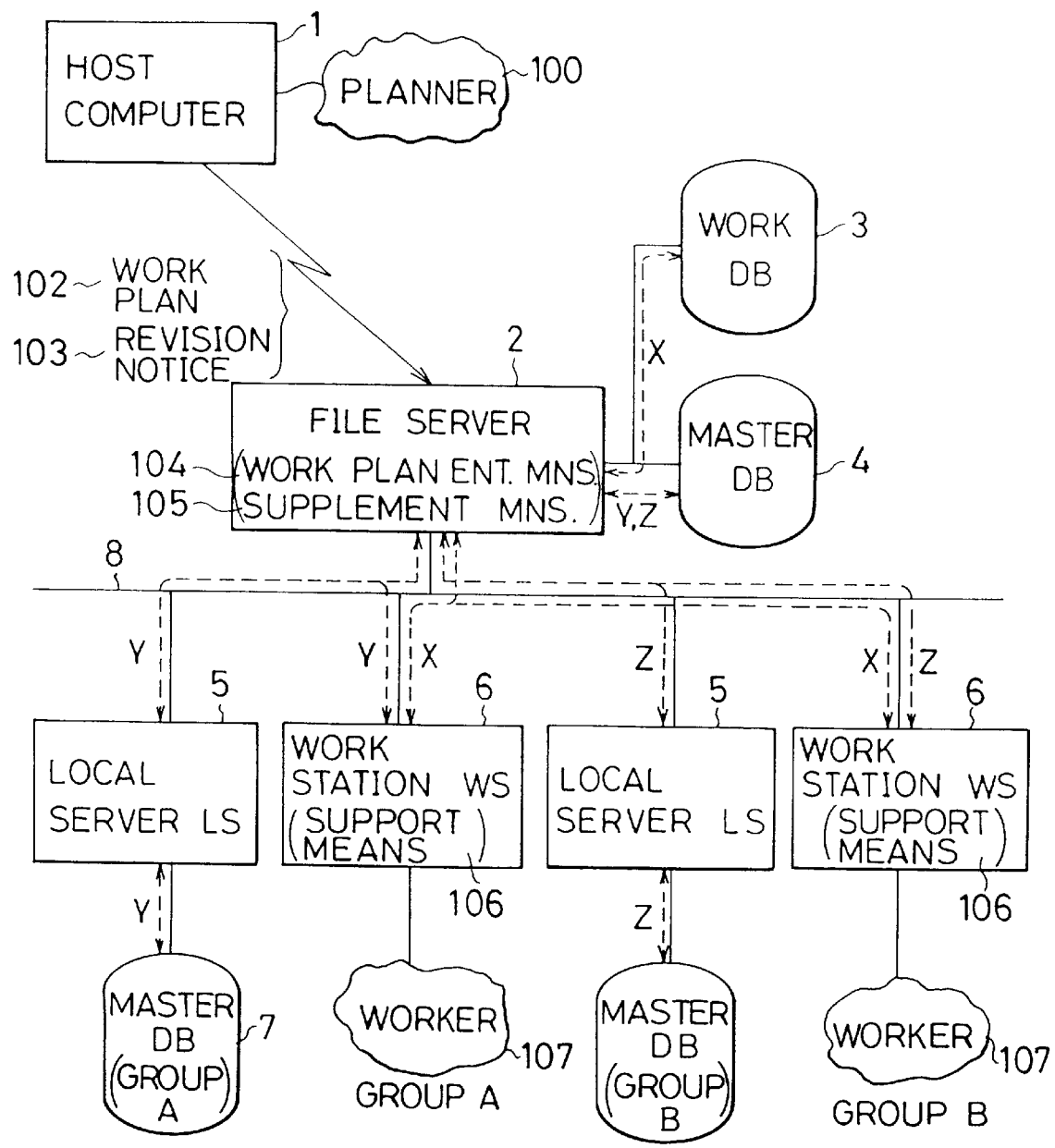
FIG. 1 shows a configuration chart of a system in an embodiment of this invention.

FIG.1 is a configuration chart of an embodiment of this invention where this user interface system is applied for a work operation system.

In this chart, a planner 100 makes a work plan. A host computer 1 receives a work plan input by the planner. A work plan 102 and a revision notice 103 for the work plan are output from the host computer to a file server 2. The file server 2 stores all files in the network. Work plan entry means 104 receives the work plan 102 and the revision notice 103 from the host computer 1. A work database 3 stores data such as the work plan. A master database 4 stores information to be applied to the work plan. Supplement means 105 supplements the work plan with the information stored in the master database. Data lines 8 are provided to configure the network. A local server 5 controls local data. A work station 6 works together with the local server and provides an operator input and editing capabilities. A second master database 7 is connected to the local server and stores local data. A worker 107 allocates actual equipment and resources for the work plan at the work station. Support means 106 supports the worker in the allocation of the equipment and the resources.

Referring to the FIG. 1., the operation of this embodiment will now be described.

In this work operation system, the planner 100 makes a work plan and sends it to the file server 2 through the host computer 1. Meanwhile, a worker 107, who will execute the work plan sent by the planner uses the work station 6. The worker stores information of required equipment and resources for the work plan in advance in a master database 7 which is connected to a local server 5. The planner creates and inputs the work plan, while the worker inputs the necessary equipment and resources for the work plan independently.

In this work operation system described in the FIG. 1. the above data which are independently input by the planner and the worker can be effectively combined.

When the work plan 102 is received by the work plan entry means 104, appropriate information of the equipment and resources necessary for the work plan is detected and supplemented with the work plan by the supplement means 105, as arrows X and Y show. The work plan supplemented with the master information is stored in the work database 3.

However, only data available in the master information are supplemented by the supplement means 105. Consequently, the work plan stored in the database 3 is not ready for execution, yet, as all the required equipment and resources data must be available to execute the work plan. To complete the work plan, support means 106 is used to fill the work plan, as arrow X shows. Human judgement is made and input to the support means 106, when the supplement means 105 does not have enough information to complete the work plan.

The support means are located at an easily accessible work station for access by the worker 107. Normally, as the work plan is executed in a unit like a group, including a department and sections, a work station is installed locally in each unit. When a master database 7 is installed locally in each unit, the work station can access the master database frequently through the local server.

Figure 2:
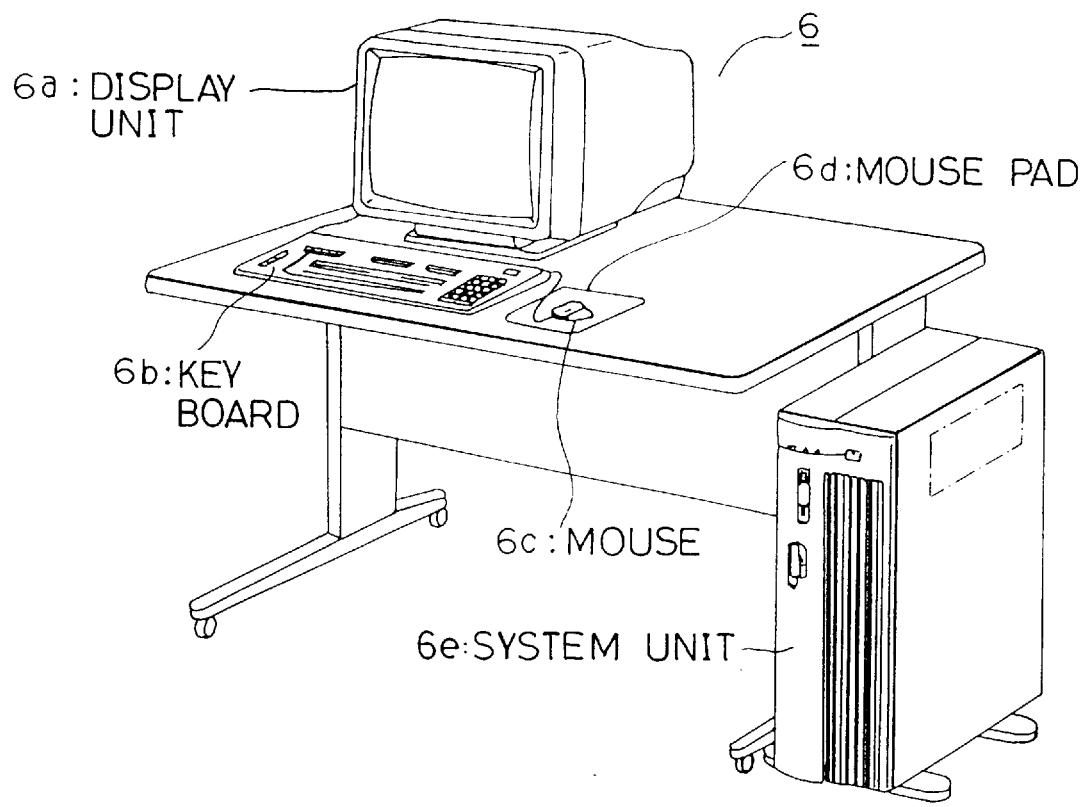
FIG. 2 shows a configuration chart of a work station in an embodiment of this invention.

FIG. 2 is an illustration of the work station 6 described in the FIG. 1. A display unit 6a displays the data on a screen. A keyboard 6b is used to input letters and figures and a mouse 6c is used to point out a position on the display unit. A mouse pad 6d and a system unit 6e are also shown.

Figure 3:
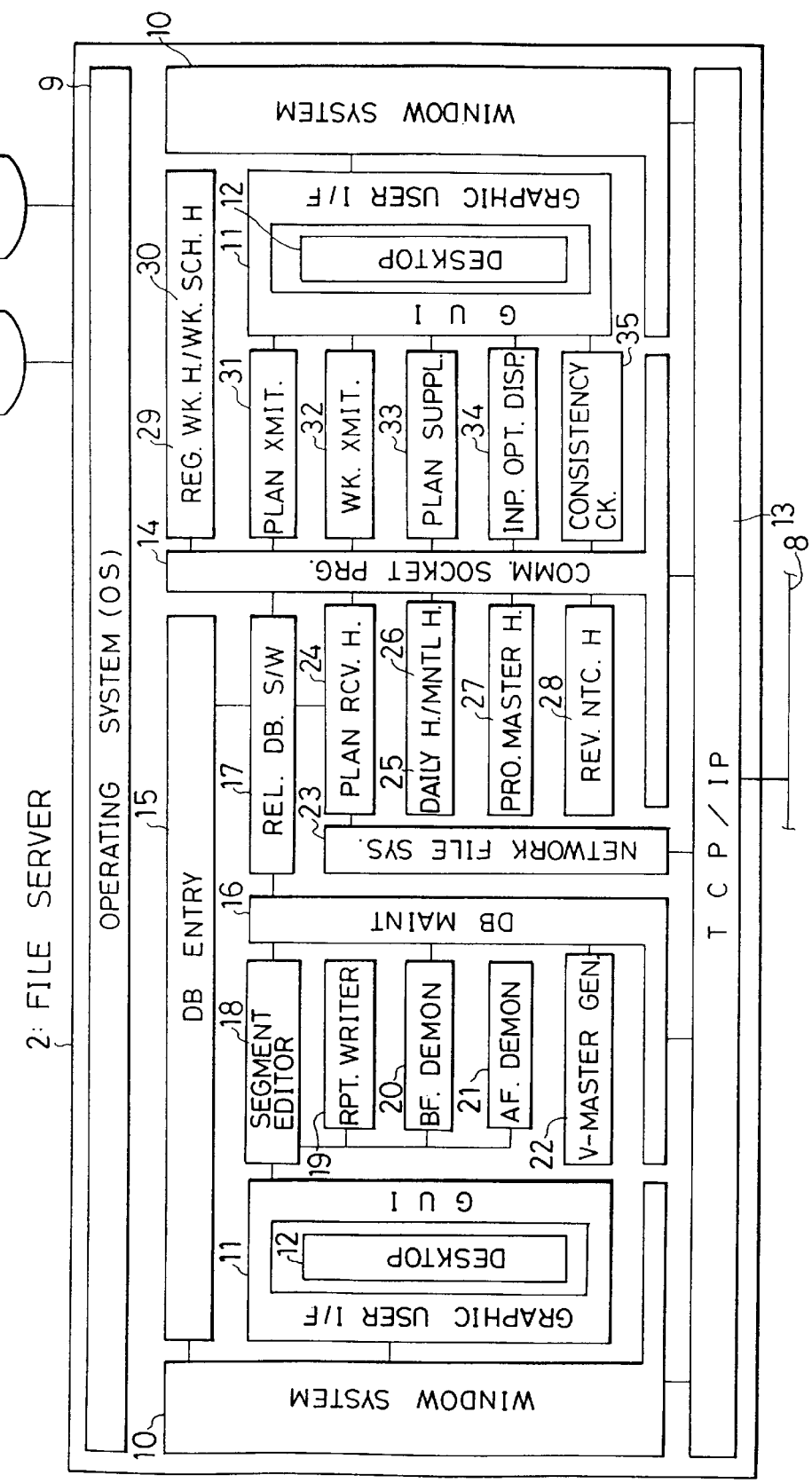
FIG. 3 shows a configuration chart of a file server in an embodiment of this invention.

FIG. 3 is an internal block diagram of the file server 2 described in the FIG. 1. In FIG. 3, an operating system (OS) 9 controls the whole file server. A window system 10 operates under the operating system. A graphic user interface (GUI) 11 operates under the window system. A desk top 12 operates on the graphic user interface and offers a desk top environment for the users. A TCP/IP 13 is an interface to the data lines 8. A communication socket program 14 is used to communicate with the host computer and the work station. A database entry 15 is used to enter data into the database. A database maintenance 16 updates the data stored in the database using the data input by the database entry 15. A relational database software 17 is used to handle data in the database in a relational way. A segment editor 18 inputs, displays and edits segments in the display unit by using the graphic user interface function of the graphic user interface. A report writer 19 outputs reports working together with the segment editor 18. A before demon 20 also works with the segment editor 18 to display input procedure for the segment editor and to check if the data chosen by the segment editor is consistent with other data. An after demon 21 also works with the segment editor 18 to edit as requested by the segment editor and to present the data in the database in a desired form for the users. A vertical-master generator 22 automatically generates headings on the ordinate in a window displayed by the window system. A network file system 23 stores data received through the data lines. A plan receive handler 24 receives the work plan from the host computer through the network file system 23 and handles the work plan. A daily handler 25 handles the work plan stored in the work database in daily calendar basis. A monthly handler 26 edits the work plan stored in the work database in monthly calendar basis. A program master handler 27 handles the program master data stored in the master database 4. A revision notice handler 28 inputs a revision notice entered from the host computer and edits the work plan stored in the work database 3 accordingly. A regular work handler 29 is used to generate a regular work in the work database 3, when the worker has a periodical regular work. A work schedule handler 30 handles work schedules of the workers in the work database 3. A plan transmitter 31 informs workers' work. A work transmitter 32 informs the scheduled work to allocated workers. A plan supplementer 33 supplements the work plan sent from the host computer with the master information provided by the worker. An input option displayer 34 displays optional master information as candidates to supplement the unsupplemented information in the work database. A consistency checker 35 checks if the supplementing master information is consistent with other information. For example, the consistency checker 35 checks double-booking of the resources or expiration of the period of the resources.

Figure 4:
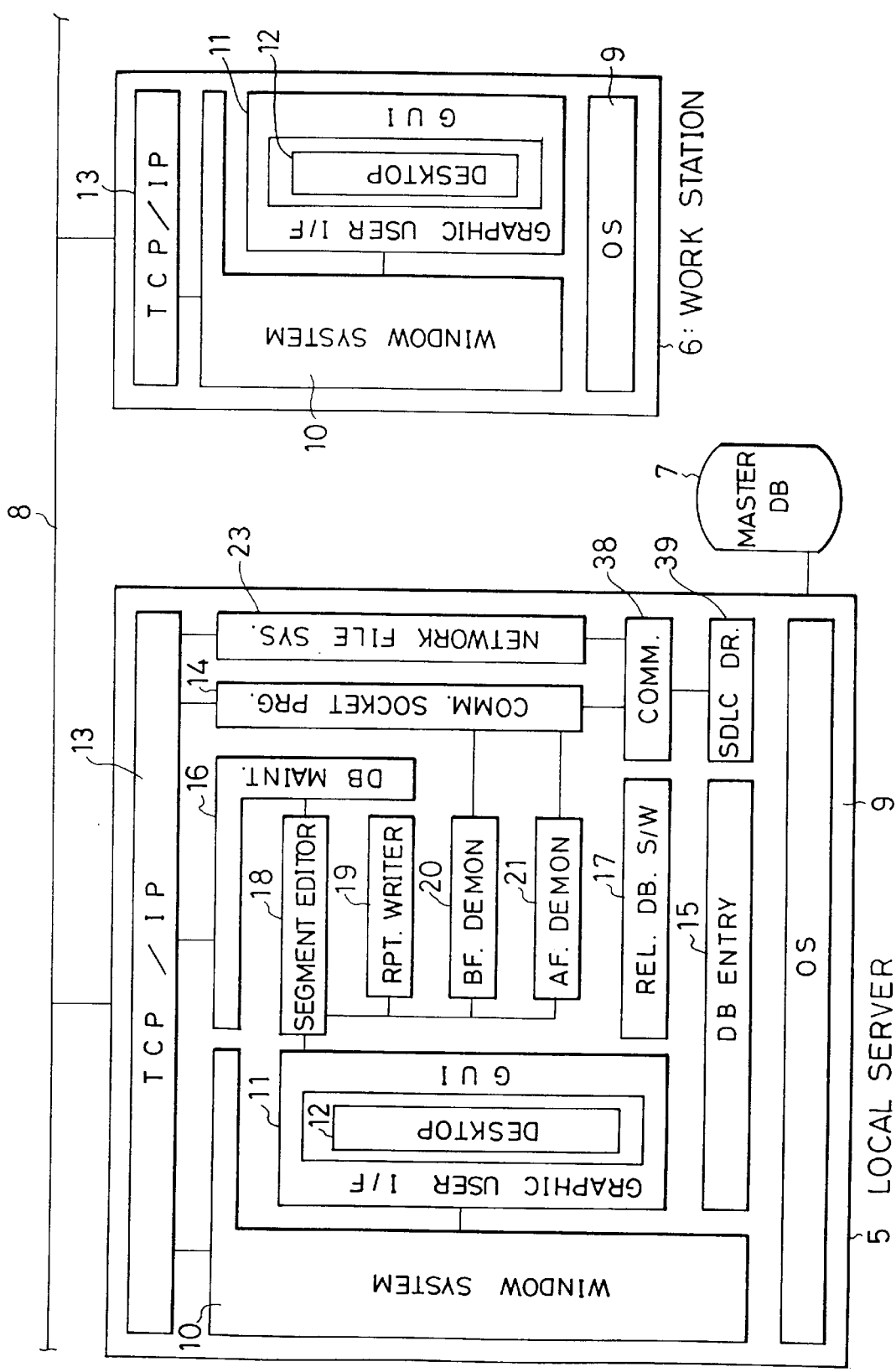
FIG. 4 shows a configuration chart of a local server and a work station in an embodiment of this invention.

The local server 5 and the work station 6 are explained further with reference to FIG. 4.

Explanations of elements 9 to 23 in the FIG. 4 are omitted here, as elements 9 to 23 are similar to the ones in the file server shown in the FIG. 3.

In the FIG. 4, a communication handler 38 is used when the local server communicates. A SDLC driver 39 is used when the communication handler establishes communication.

The local server 5 is simpler when compared with the file server 2, as the local server inputs the data to the master database 7 and edits the data stored in the master database 7. On the other hand, the file server is more complex, as it controls and maintains the whole work database.

Additionally, the window system 10, the graphic user interface 11 and the desk top 12 which offer an effective man-machine interface are also provided in the work station. Application programs which are used by the work station 6 are not shown, but they may exist either in the work station 6 or in the local server 5.

Figure 5:
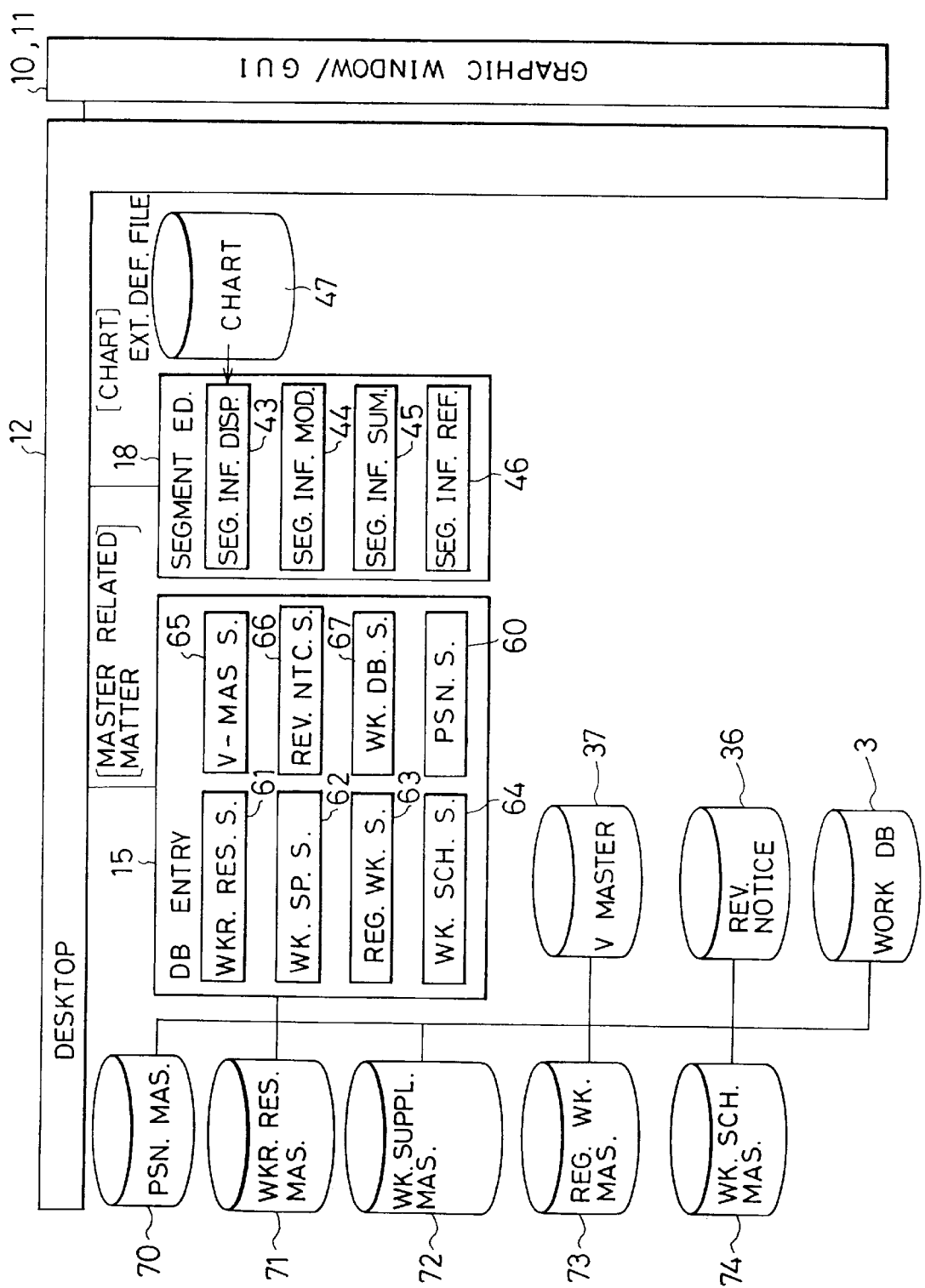
FIG. 5 shows a configuration chart of data in an embodiment of this invention.

In FIG. 5, the master database is described for a case where this work operation system is used for a broadcasting program production system. In FIG. 5, a personal master 70 is used to store information on persons, such as technical staff members who make a program. A worker reservation master 71 is used to reserve workers for the work plan. A work supplement master 72 stores specifications such as responsible unit, required number of workers and equipment for the work plan as work supplement information. A regular work master 73 is used to store regular work schedule of each group when such periodical work exists. A work schedule master 74 is used to store individual work schedules. A vertical-master 37 automatically generates headings on the ordinate in a window. A revision notice file 36 stores a revision notice received from the host computer. The work database 3 stores the work plan, as explained earlier. The database entry 15 which is explained earlier accompanies the following entry screens:
(1) A personal screen 60
(2) A worker reservation screen 61
(3) A worker supplement screen 62
(4) A regular work screen 63
(5) A work schedule screen 64
(6) A vertical-master screen 65
(7) A revision notice screen 66
(8) A work database screen 67, etc.

The segment editor 18 is also shown in the FIG. 5. A chart file 47 is an external definition file to be used by the segment editor. The segment editor 18 accompanies the following parts in order to edit segments:
(1) A segment information displayer 43 displays segment information using the chart file 47.
(2) A segment information modifier 44 updates displayed segment information.
(3) A segment information summarizer 45 displays segment information with a different time scale such as daily and monthly.
(4) A segment information referencer 46 copies and refers segment information.

Figure 6:
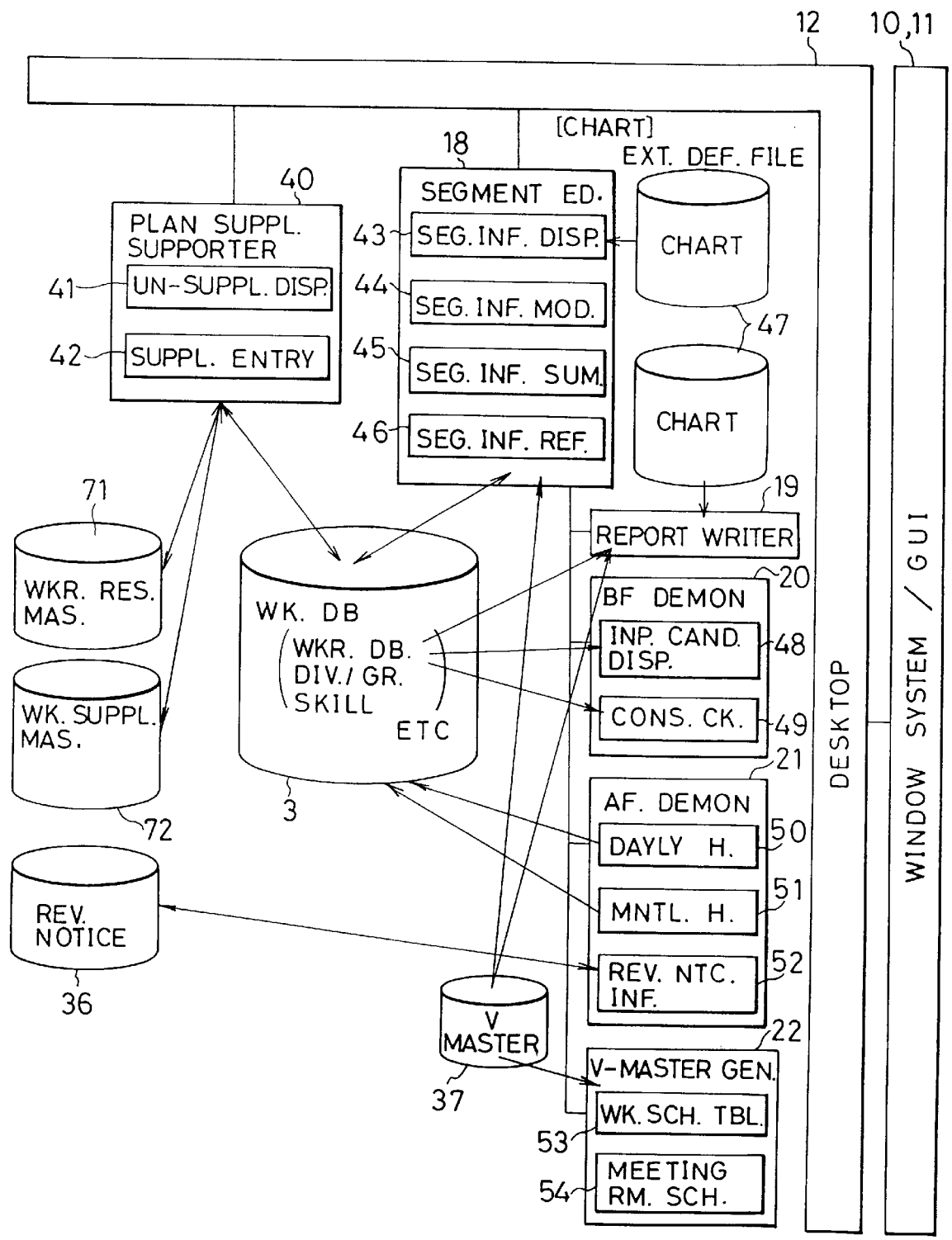
FIG. 6 shows a configuration chart of a segment editor in an embodiment of this invention.

In reference to the FIG. 6, the work plan supplement operation is summarized as follows;

The work plan received from the host computer 1 is supplemented using the master information stored in the worker reservation master and the work supplement master. However, since this supplement is incomplete, a plan supplement supporter 40 displays the unfilled information using an un-supplement displayer 41 and receives supplement information using a supplement entry 42.

As described earlier, the segment editor 18 accompanies a segment information displayer 43, a segment information modifier 44, a segment information summarizer 45 and a segment information referencer 46. The segment editor displays, modifies and edits segments and information related to the segments.

The chart file 47 is an external definition file which stores segments which are input, updated and edited by the segment editor 18. A report writer 19 defines output information to be sent to a printer using the segment information stored in the chart file 47.

The before demon 20 accompanies an input option displayer 48 and a consistency checker 49. As described earlier, the input candidate displayer 48 displays candidates using master information when the work plan is supplemented by the supplement entry 42. The consistency checker 49 checks if the information chosen by the supplement entry 42 is consistent and if it is double-assigned or expired, or not. As described, the before demon 20 helps the supplement entry 42 to choose a correct information easily.

The after demon 21 accompanies a daily handler 50 and a monthly handler 51. In another way, the after demon puts the daily handler 25 and the monthly handler 26 in operation. Since the daily handlers 50 and 25 and the monthly handlers 51 and 26 in the both cases operate in a same way, explanation here is focused on the case of the daily handler 50 and the monthly handler 51.

The daily handler 50 finds and displays daily information for the next three months from the work database and the monthly handler 51 summarizes and displays the information in monthly base.

The daily handler 50 and the monthly handler 51 operate as follows;

The work database 3 stores the daily work plan for the next three months. The daily handler 50 displays the information stored in the work database by using the segments The monthly handler 51 displays either a monthly work schedule or a monthly worker schedule, when a month is designated from the three months stored in the work database. The monthly work schedule provides a schedule for each program, while the monthly worker schedule provides a schedule for each worker.

Owing to the introduction of the daily handler 50 and the monthly handler 51, this system has succeeded in providing schedules for the work, the workers and the equipment (studios, etc.) in both daily and monthly base.

Then, a revision notice informer 52 inputs revision notices from the revision notice file 36 and displays a list of revision notices. As described, the after demon 21 edits and modifies the data in the work database and provides them to the operators.

Meanwhile, the vertical-master generator 22 decides the items and the number of items to be displayed vertically in a column in a window. More explanation on the vertical-master generator is omitted here, as it is not important in this embodiment.

Figure 36:
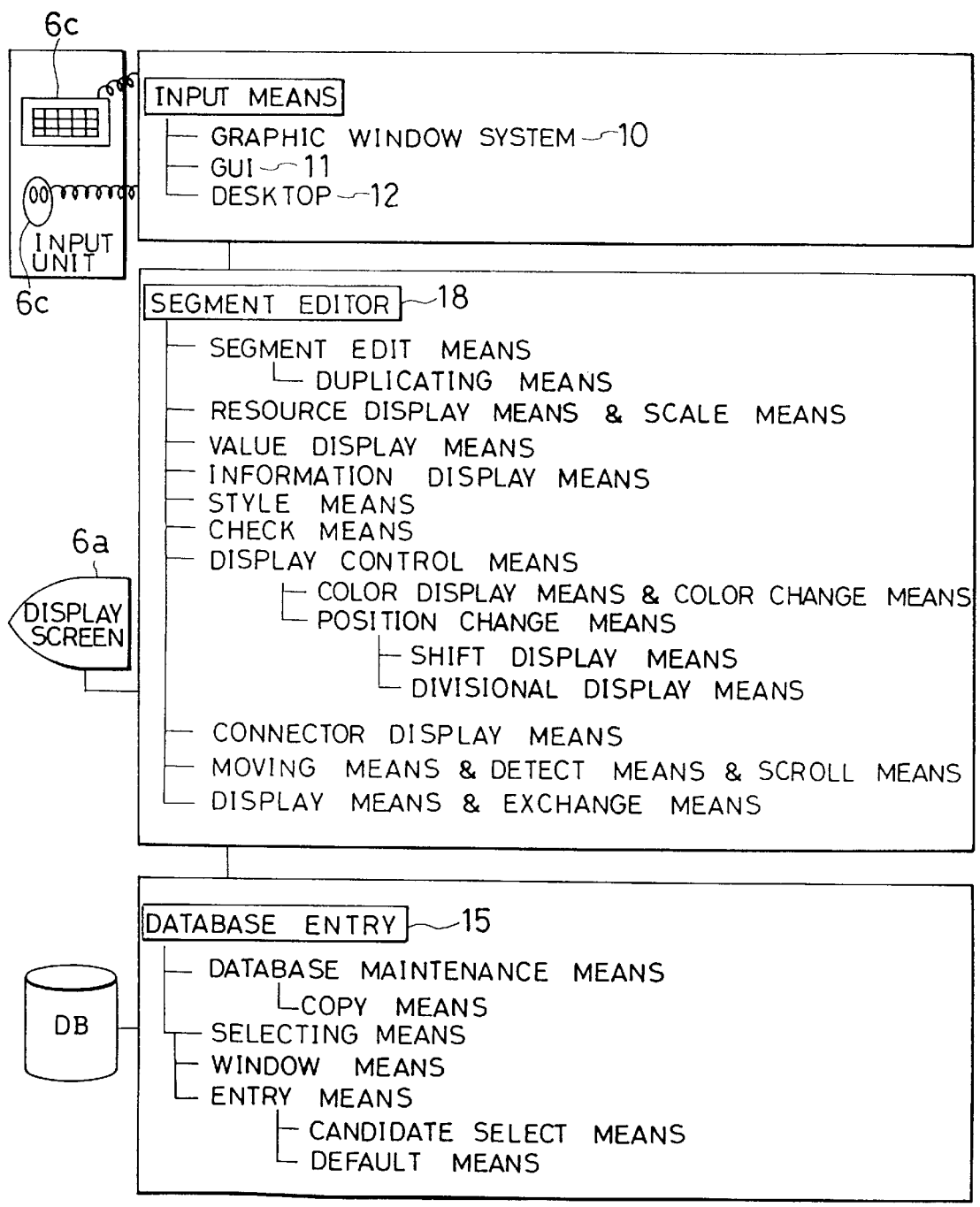
FIG. 36 shows a block chart of a configuration of the user interface system of this embodiment.

FIG. 36 illustrates a configuration of the user interface system of this embodiment. In the user interface system of this embodiment, a keyboard and a mouse are provided as input units. Input means, which includes the window system 10, the graphic user interface 11 and the desk top 12, receives input from the input devices. The segment editor 18 accompanies multiple means as shown in the FIG. 36. The segment editor displays a segment on a display screen and is an interface between the input means and the database entry 15. The function of each means included within the segment editor 18 in the FIG. 36 are clarified later in the descriptions of the embodiments. The database entry 15 stores data received from the segment editor in the database. The database entry 15 receives additional information related to the segments aside from the data from the segment editor and also stores the additional information in the database. Details of each means in the FIG. 36 will now be explained.

With reference to FIG. 7, the following is the operation of the segment editor 18. The FIG. 7 illustrates a window of a studio schedule for broadcasting program production. In the FIG. 7, a window 300 displays a title 310 and a calendar day 320. The title 310 is "Studio Schedule" and the calendar day 320 is "Today" in this example. A time scale 330 shows the hours in the calendar day along a row. Names of the studios 340 used for the broadcasting program production are shown in a column. As described, the window 300 shows hours horizontally and studios vertically to display the studio schedule for "Today."

In the FIG. 7 a segment 200 is drawn. Its beginning time 201 is "6:30" and its ending time 202 is "12:00." A segment detail screen 210 shows the information related to the segment 200. In this example of the segment 200, a program code is "number 25" and a title is "Comfortable Ranch." A date and a time of production are also shown. An assigned group and an assigned worker are also shown. In this example, the assigned group has group code 50 and the assigned worker is "YAMADA KAZUO" having employee number 1 in the group code 50. Displays of "Z" and "( )" indicate that no worker is appointed yet there.

With reference to the FIG. 7, the following description is of the operation of the segment editor 18 for the above-mentioned example. For instance, when a program should be appointed for the studio 102, the segment 200 is drawn in the window 300 by using a mouse. The mouse is clicked when a cursor is at the point of 6:30. When the mouse is clicked, the segment editor displays "6:30" on the screen to notify that the cursor point is at "6:30." The operator could easily know if the operation is done rightly by clicking the display of "6:30." Then, the mouse is dragged from 6:30 to 12:00 with the mouse button down. While dragging the mouse, the segment editor 18 displays the time of the cursor point in ten or five minutes intervals and draws a segment from 6:30 to the present cursor point. When the mouse button is released at 12:00, the segment is drawn as in the FIG. 7. The beginning time and the ending time are also shown at two ends of the segment.

After this, the segment 200 is pointed to and selected by the cursor in order to display the segment detail screen 210. The segment detail screen 210 shows information related to the segment. The segment detail screen 210 is also used to input detail information for the segment 200.

The user interface system according to this embodiment provides the input means for inputting a segment by pointing out an arbitrary position of the display screen with the input unit such as a mouse for pointing out arbitrary positions of the display screen. The segment has a position and a length to indicate hours or days. The segment editor displays the segment according to the length which is designated by the input unit such as a mouse. The database entry stores the data indicated by the position and the length of the segment as entered data.

Thus, data is entered by inputting a segment. Therefore, data such as a time and a date are not needed to be entered from a keyboard. Since data entry is made by drawing a segment by using a mouse, operation is easy. Furthermore, since the length of the segment shows the hours or period visually to a system operator, the chances of errors are lessened.

Furthermore, the FIG. 8 shows a display for a case where the segments are overlapped. In the FIG. 8, the segments 220, 221 and 223 are overlapped.

In the FIG. 8(a), the segment 223 is displayed with priority compared with the other segments. The segment 223 is displayed as a straight line arrow, while the segments 220 and 221 are displayed as dotted line arrows.

Other possibilities include diplaying the segment 223 in a normal color (white in this case), while the segments 220 and 221 are displayed in a less-outstanding color, a color closer to the back ground color, for example. It is also possible to display the segment 223 in a brighter tone, if needed.

It is noteworthy that, even when the segments are overlapped, the beginning and the end of the segments can be distinguished by sliding each segment vertically. By sliding the overlapped segments vertically, each segment is distinguished clearly.

In the FIG. 8(b), the segment 221 is displayed with priority. When the cursor of the mouse is clicked at a point in the field of the segment 221 of the FIG. 8(a), the segment 221 is displayed with priority. When the segment 221 is given a priority by this operation, the segment 221 is displayed on the top among the segments. At the same time, the segment 221 is displayed in a straight line or in a normal white color or in a brighter tone. Consequently, the segments 220 and 223 with less priorities are displayed in a dotted line or in a color closer to the back ground color or in a less bright tone.

The user interface system according to this embodiment provides the display control means which controls the overlapped segments in order to make each segment distinguishable. Therefore, even when the segment editor displays a plurality of segments at a position, the displayed segments are in order. The display control means controls either by changing a display color or changing a display position. In either case of the color change and the position change, the difference is distinguished visually at once.

Figure 9:
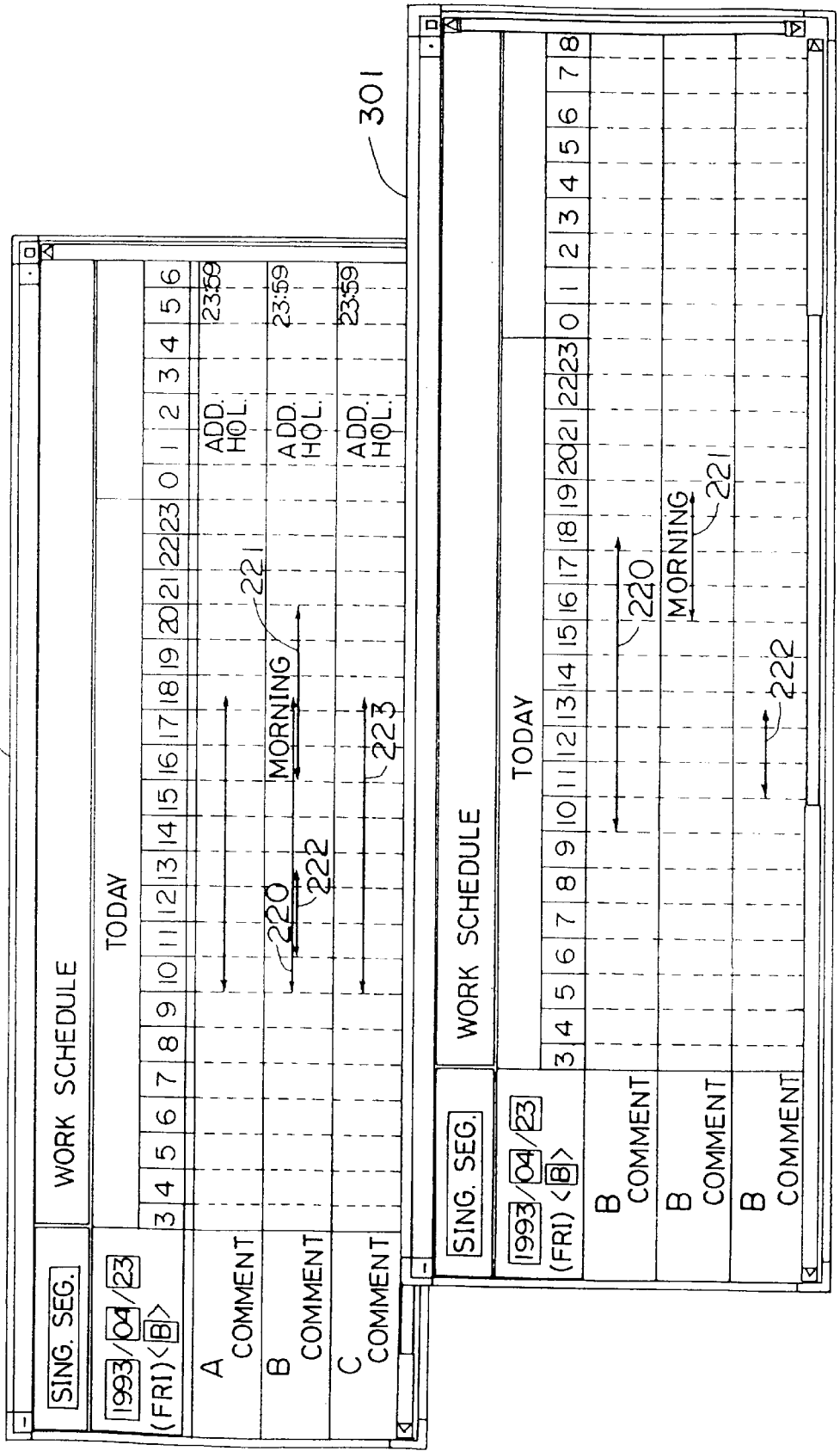
FIG. 9 shows displays of segments in multiple rows in an embodiment of this invention.

FIG. 9 is another example of a display where the segments are overlapped. In the FIG. 9, the segments 220, 221 and 222 are displayed with overlapping in a window 300, while such segments are displayed in different rows in a window 301. In the window 301, the segment 220, 221 and 222 are separately displayed in three rows.

By displaying the overlapped segments in different rows, information related to the segments are also displayed in each separate row. That helps to present the information related to the segments clearly.

The user interface system according to this embodiment provides a system to shift the positions of the segments to display and a system to display the segments at different positions without any overlapping thereby providing overlapped segments which are distinguishable. In either case, each segment is distinguished visually.

In FIG. 10, illustrates an embodiment where information is displayed in a plurality of windows. A data space 450 corresponds to a whole data area stored in a memory. FIG. 10 shows only a part of the data space. The windows display an appropriate size of data out of the complete data space.

For example, a window 301 displays data X out of the data space. When the window 301 is moved, the display is changed. When the window 301 is moved to the place of a window 302, the display is scrolled from the data X to the data Y. When the window 301 is moved to a window 303, the display is scrolled to the data Z. By moving the window, desired data out of the complete data space are displayed in the window.

Figure 10A:
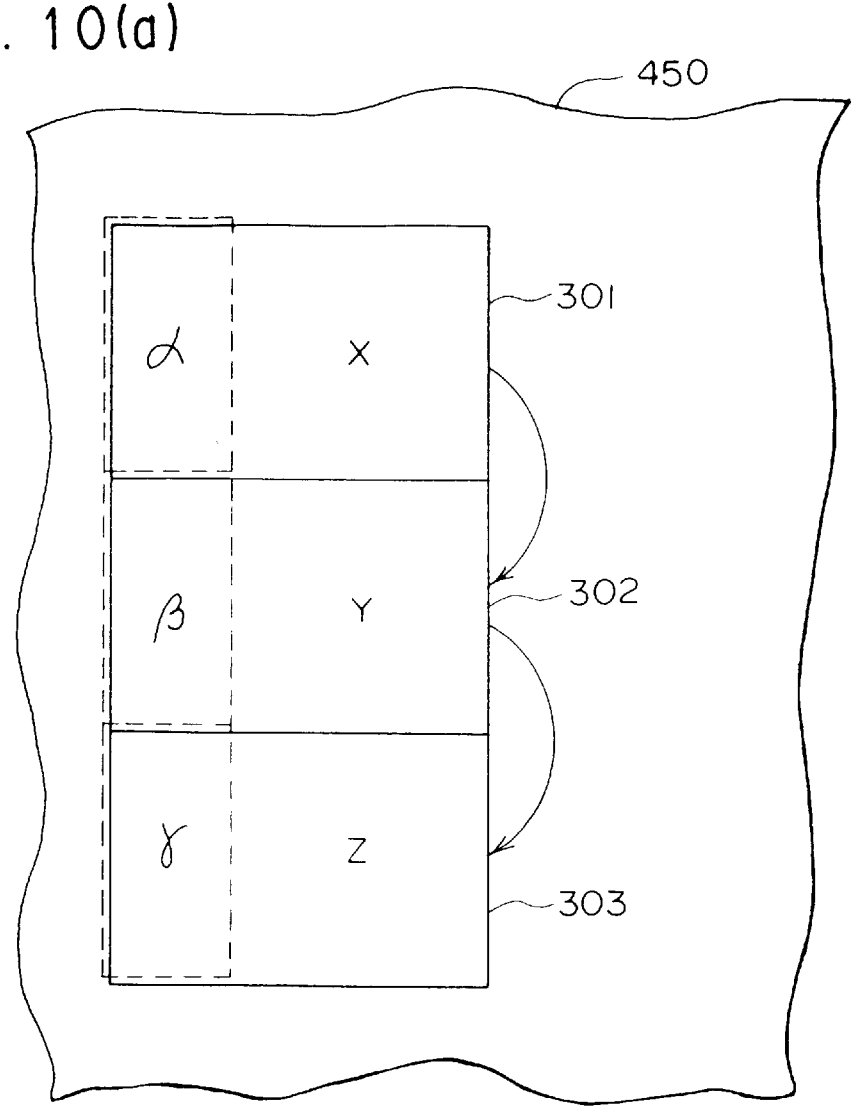
FIG. 10(a)–10(b) show a division of a window in an embodiment of this invention.
Figure 10B:
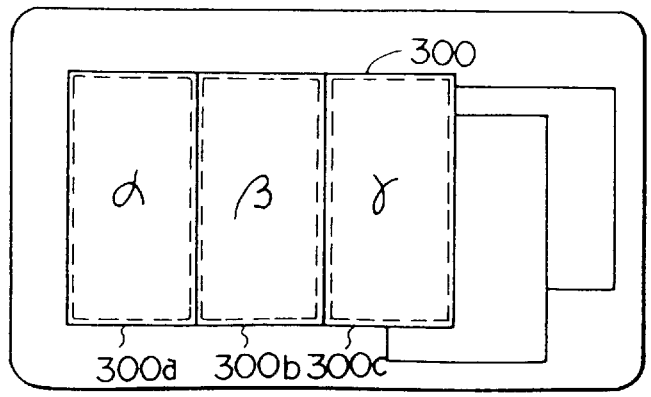

However, for the example of FIG. 10(a), when data $\alpha$, $\beta$, $\gamma$ are vertically too long to be displayed together. In that case, the window 300 is divided vertically in three areas, 300a, 300b and 300c and the data $\alpha$, $\beta$, $\gamma$ are displayed in each area as in the FIG. 10(b). As mentioned, when the data are vertically too long to be displayed, the data are divided horizontally and displayed in each area of a window which is divided vertically. By displaying such data in the divided areas of a window from the left to the right, the whole desired data are shown in a single window.

Figure 11:
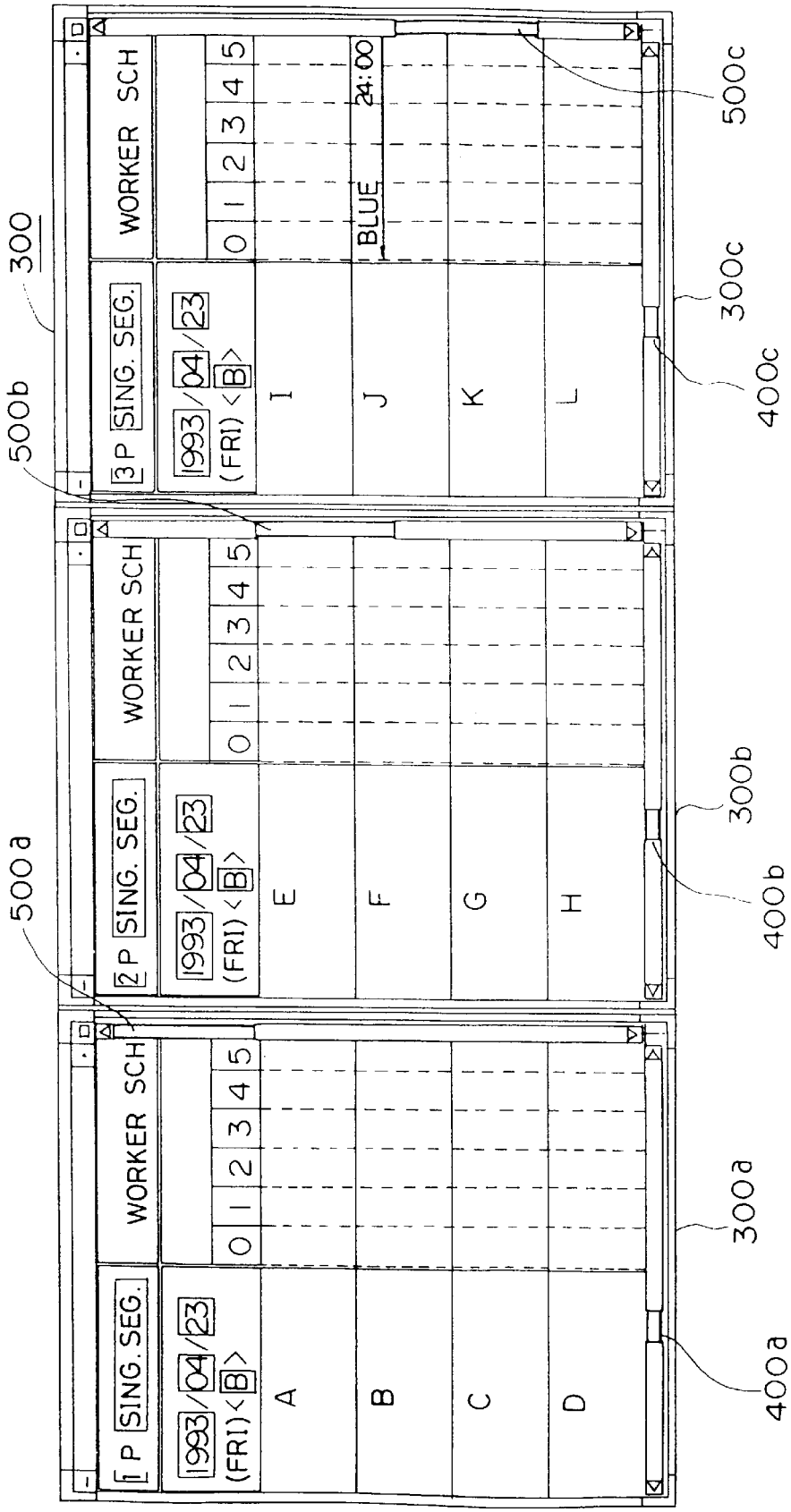
FIG. 11 shows a division of a window in an embodiment of this invention.

FIG. 11 is an example of displaying the areas 300a, 300b and 300c in the window 300. In this example, the record A through record L are located vertically in the data space. The data are divided into three groups, Group I including record A to record D, Group II including record E to record H and Group III including record I to record L and are displayed in the vertically divided areas from the left to the right.

In the FIG. 11, scroll bars 400a, 400b and 400c are used to scroll the displayed information horizontally. As the areas 300a, 300b and 300c show the same columns, the scroll bars 400a, 400b and 400c are placed in an identical position in each area.

In the FIG. 11, the scroll bars 500a, 500b and 500c are used to scroll the displayed information vertically. As the areas 300a, 300b and 300c show the different rows, the scroll bars 500a, 500b and 500c are placed in a different point in each area.

When the scroll bar 400a is selected by a cursor and scrolled to the right side by the cursor, the scroll bars 400b and 400c also move to the right side and scroll the data. In other words, when the display in the area 300a is scrolled, the displays in the areas 300b and 300c are scrolled synchronously.

Figure 12:
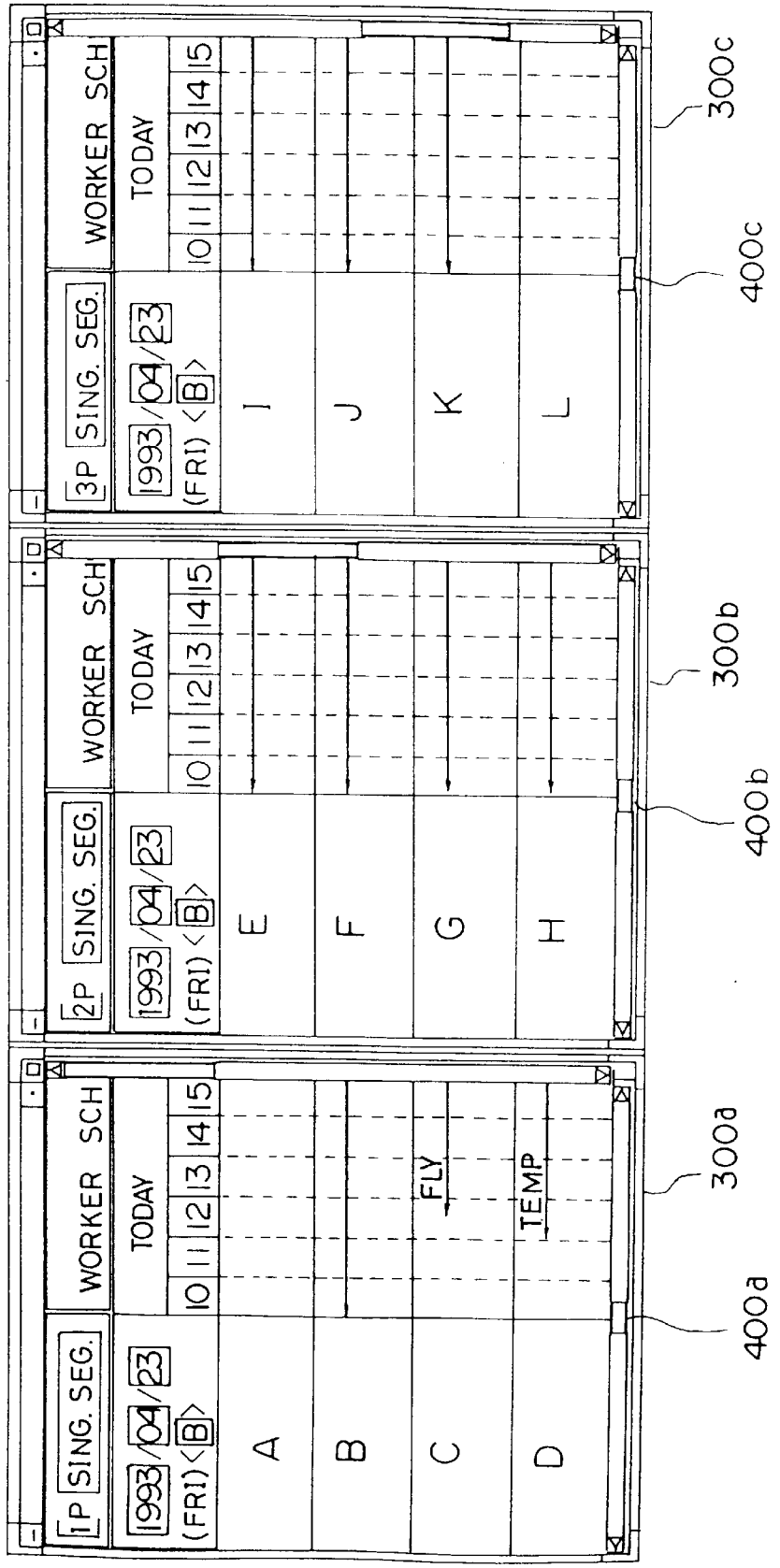
FIG. 12 shows a division of a window in an embodiment of this invention.

FIG. 12 shows an example where the areas 300a, 300b and 300c are scrolled synchronously, when the scroll bar 400a is moved to the right side in FIG. 11. In FIG. 11, each area shows the data starting with 0, 1, 2, while in the FIG. 12, each area shows the data starting with 10, 11, 12. This demonstrates that time is changed from 0:00 to 10:00 by scrolling horiaontally and that the display is scrolled in sequence.

However, when the scroll bars 500a, 500b and 500c are used to scroll the displays vertically, the displays in the three areas are not scrolled synchronously. For example, as the scroll bar 500a is used to scroll the area 300a upwards. A display of record A disappears at the top of the display and a record E appears at the bottom of the area 300a, but the displays of the areas 300b and 300c are not updated. At this moment, record E appears both at the bottom of the area 300a and at the top of the area 300b.

When the data are displayed in two places as in this example, the same information appears, as the source is same. When the record E in the area 300a is edited by a mouse, etc., the record E in the area 300b is edited in the same way synchronously.

As described, when an area of a windowis scrolled vertically, three areas are not scrolled synchronously When the same data are displayed in plural areas and the data in an area are edited, the displays in other areas are updated synchronously as the source is same.

The user interface system according to this embodiment provides a system to display vertically long data in side-by-side windows. Consequently, the whole vertically long data may be viewed together.

Figure 13:
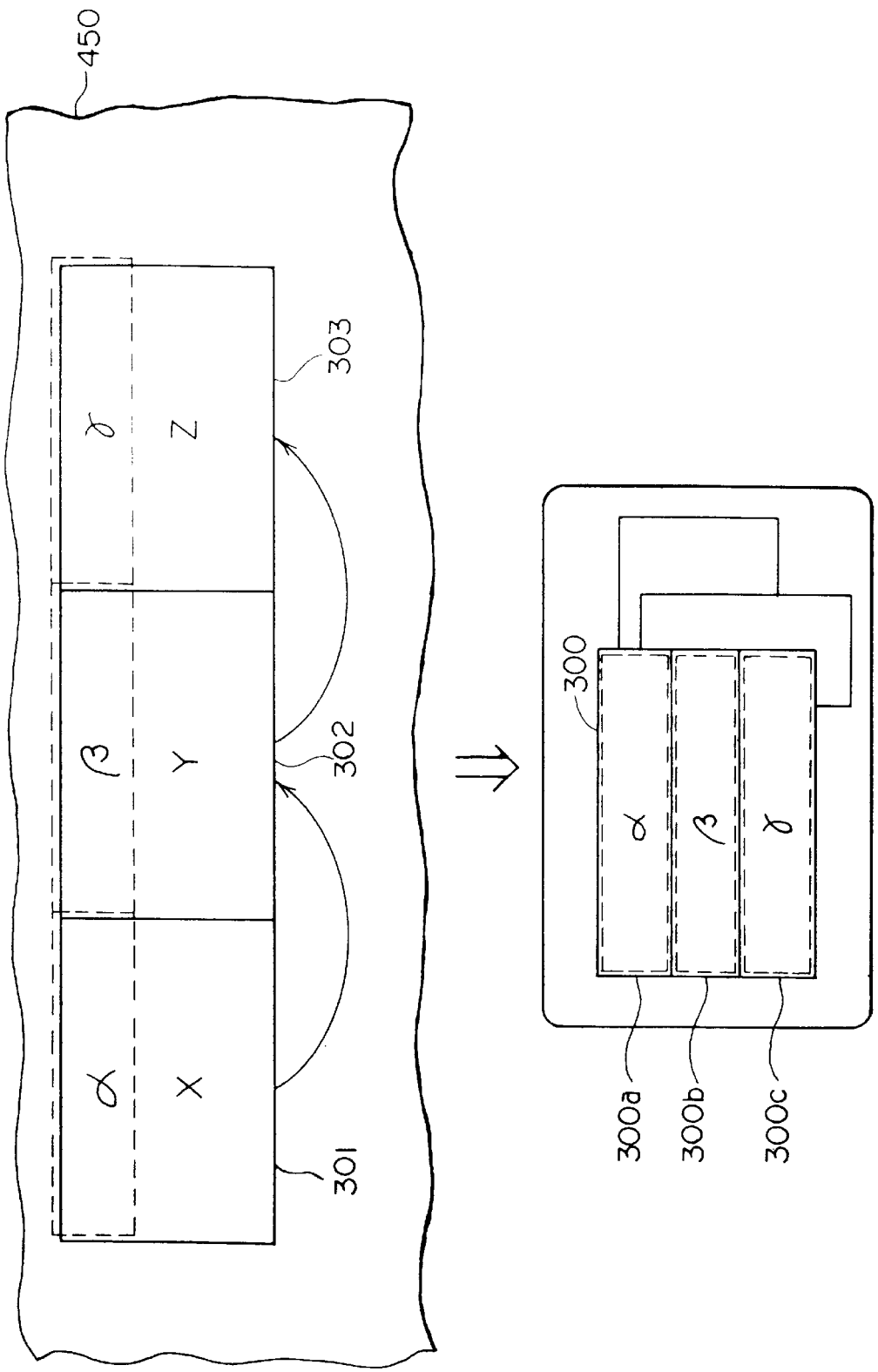
FIG. 13 shows a division of a window in an embodiment of this invention.

FIG. 13 illustrates a case of displaying the data in a window, when the data are horizontally too wide. The window 300 is divided horizontally to make the areas 300a, 300b and 300c as shown in the FIG. 13. The data are also divided into α, β, γ and displayed in each divided area. In this way, all of the data are displayed in a window, even if the data are horizontally too wide to be displayed in a window.

Figure 14:
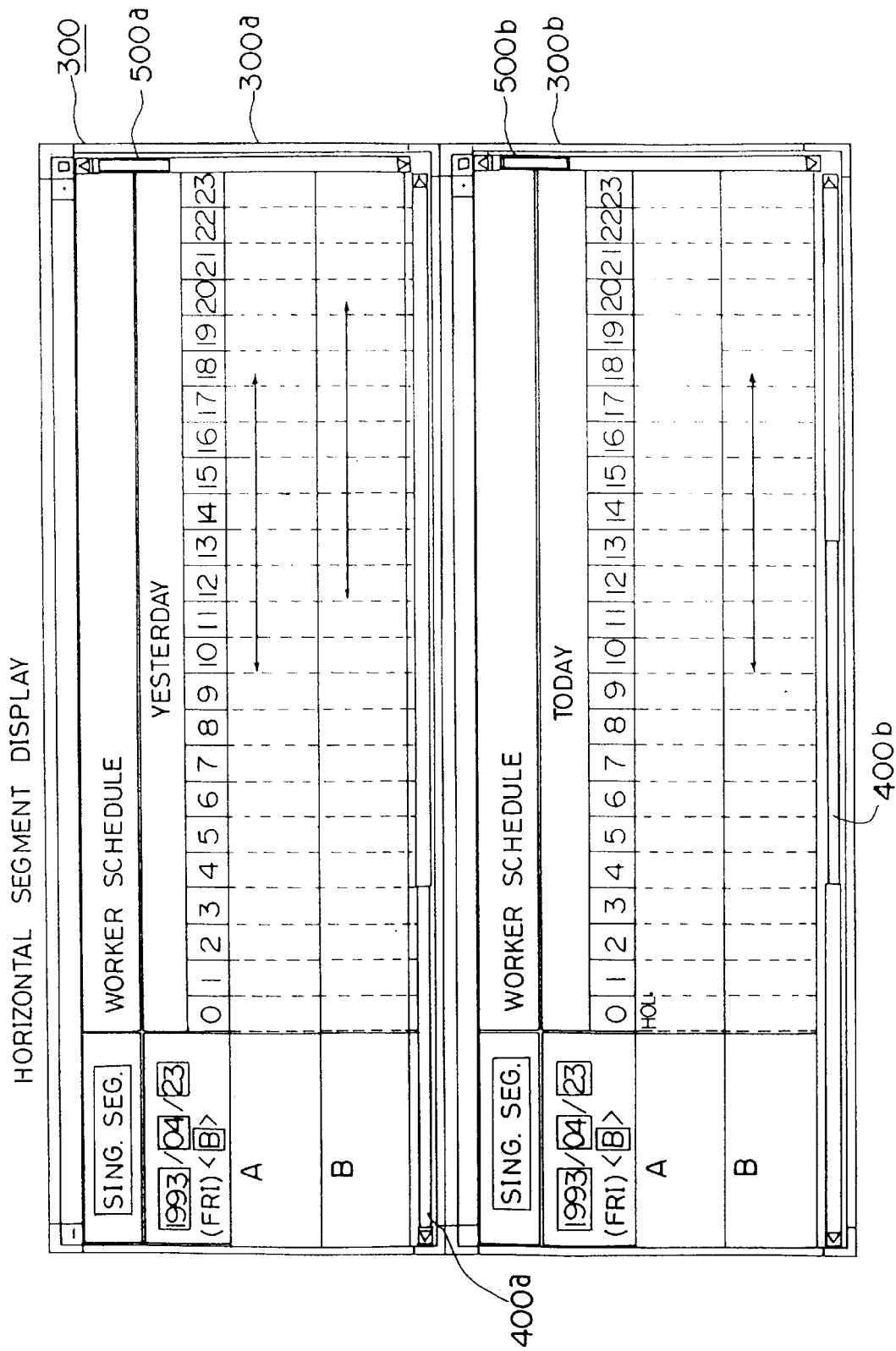
FIG. 14 shows a division of a window in an embodiment of this invention.

FIG. 14 is an example of displaying the data in a window, when the data are horizontally wide. In this example, the window is divided into two areas, 300a and 300b.

Since the areas display different columns (periods alongs the horizontal axis), the horizontal scroll bars 400a and 400b are placed at different points. Meanwhile, since the areas display the same rows, the vertical scroll bars 500a and 500b are placed at an identical position in each area.

When either the scroll bar 500a or 500b is used, data in both areas are scrolled synchronously. On the other hand, when either the scroll bar 400a or 400b is used to scroll the data in an area, the data in another area are not scrolled. As a result, same data may be displayed in two areas. In that case, when the data in an area are edited, the data in another area is also updated synchronously. This is because the same data are displayed in two places in the divided areas of a window. When a segment in an area is edited, the source is updated, and the segment in both areas are updated based on the updated source.

The user interface system according to this embodiment provides a system to display horizontally long data in multiple windows. Consequently, the whole horizontally long data may be viewed together.

In the examples described so far, the window is divided either vertically or horizontally into either three or two windows. However, the window may be also divided into any number of windows. The window may be also divided both vertically and horizontally at the same time.

Figure 15:
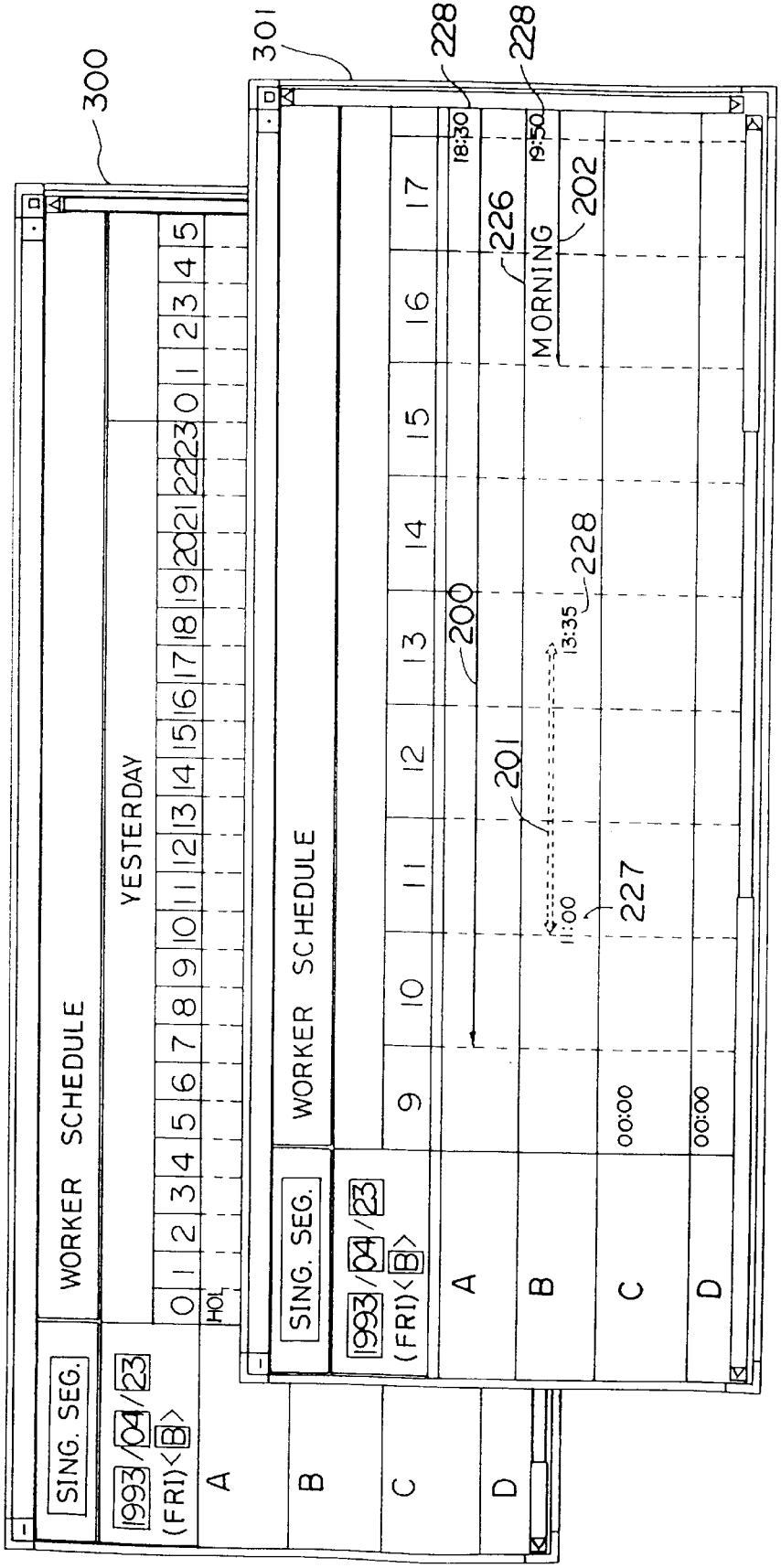
FIG. 15 shows a scale enlargement in an embodiment of this invention.

FIG. 15 is an example of a scale enlargement feature of the present invention. In the FIG. 15, a window 300 and a window 301 display individual daily work schedules.

The window 301 displays the data of the window 300 in an enlarged scale of three times. The window 301 displays only one third of the data compared with the window 300, but each data are displayed in a bigger area. In the window 301, the segments 200, 201 and 202 are displayed in the length of three times compared with the display in the window 300. Meanwhile, letters 226, 227 and 228 related to the segments are displayed in the same size with the letters displayed in the window 300 instead of the enlarged size of three times.

As described, when the data in the window 300 are displayed in the window 301, the data which depend on the scale are displayed in an enlarged size and the data which do not depend on the scale are displayed in the same size. By leaving the size of the letters unchanged to display in an enlarged area, overlapping of letters is solved, when such overlapping problem exists in the window 300.

For instance, when the segments are overlapped as in the FIG. 8, the letters relate to the segments may also be overlapped and hard to read. However, when the letters are displayed in an enlarged window 301 as in the FIG. 15, all the letters remain the same size in an enlarged window and become readable.

The user interface system according to this embodiment provides a system to display information in a larger scale without changing the scale of the display of letters in order to eliminate overlapping in considering a case where displayed letters are overlapped each other and hard to be read in a certain scale.

Figure 16A:
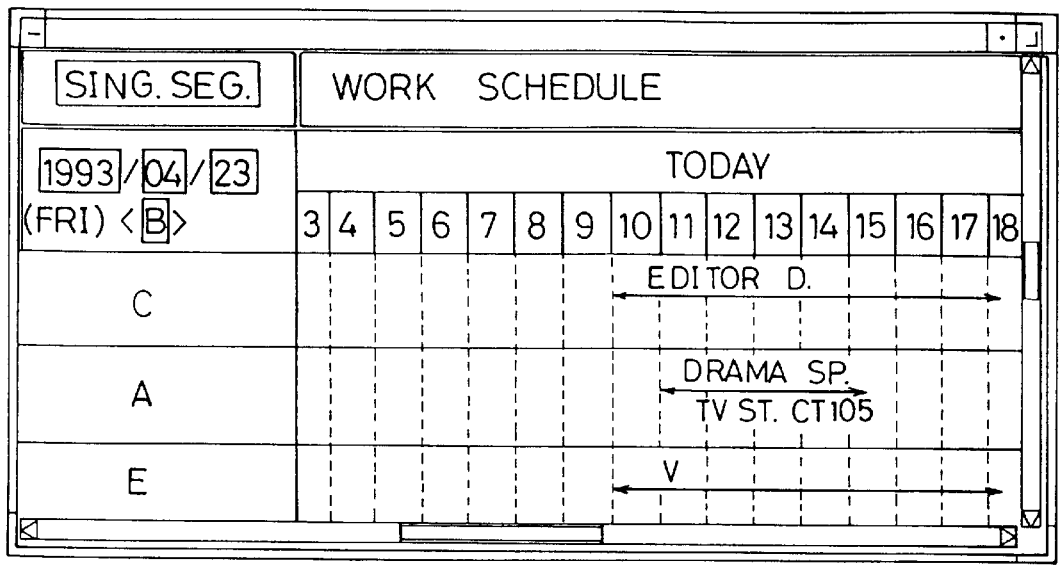
FIG. 16(a)–16(b) show a daily chart and a monthly chart in an embodiment of this invention.
Figure 16B:
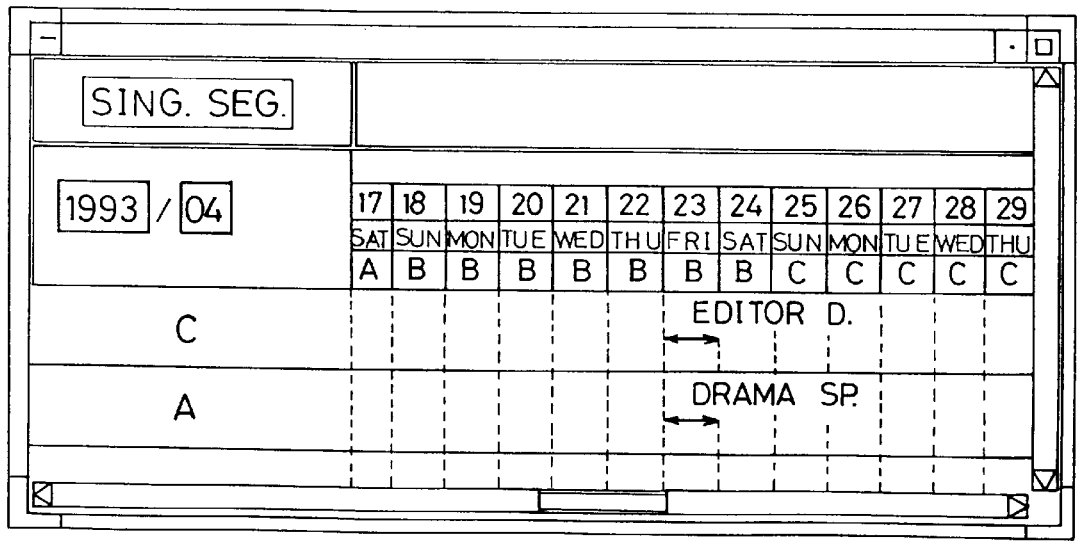

FIG. 16 illustrates an aspect of the invention which allows the time scale to be changed. In the FIG. 16(a), segments are displayed hourly for April 23, while FIG. 16(b) shows daily allotments for the month of April. Even though the time scales are different, the originally stored source is same. The FIG. 16(a) and the FIG. 16(b) result from the same data in the same memory. The daily data in the FIG. 16(a) are displayed by using the daily handler 50 and the data in the FIG. 16(b) are displayed by using the monthly handler 51.

The work database stores the daily data for the next three months. When a month is selected, the monthly handler 51 displays either a monthly work schedule or a monthly worker schedule. The monthly work schedule provides a schedule of each program, while the monthly worker schedule provides a schedule of each worker. As described, owing to the daily handler 50 and the monthly handler 51, this system has succeeded in providing schedules for the work, the worker and equipment (studio, etc.) in both daily and monthly formats.

The user interface according to this embodiment provides a system to display information both in a first time scale such as a daily representation and in a second time scale such as monthly representation. By displaying the same information in a plurality of scales, the information can be viewed together and at the same time and any details can be also referred to.

The user interface according to this embodiment also provides a system which makes information displayed in one window scroll when corresponding information displayed in another window is scrolled for the case that the windows are displaying corresponding information. Consequently, the identical data in both windows can be always referred to.

For example, when daily data are displayed in one window and monthly data of the same information are displayed in another window, the display of the window showing the daily data is scrolled in case that the display of the window showing the monthly data is scrolled. Consequently, the daily and the monthly data are scrolled synchronously.

The user interface system according to this embodiment also provides a system where a corresponding displayed information is updated when either the displayed daily or monthly data is updated. The reason why the corresponding data are updated by updating another data is that both windows refer to the identical data source.

The user interface system according to this embodiment provides a system for efficiently entering data, wherein the segment editor can display segments to show a position and a length and the segment in a window can be moved to another window without inputting the same segment again.

Figure 17:
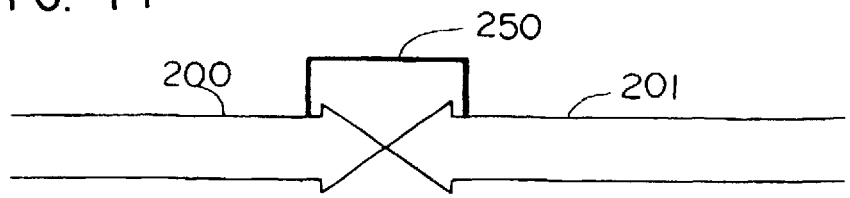
FIG. 17 shows a connector in an embodiment of this invention.

FIG. 17 illustrates an aspect of the invention which provides for combining segments. In the FIG. 17, a connector 250 combines the segment 200 and the segment 201.

When the two segments have the relationship which must be executed consecutively or when the two segments are inseparable, the segments 200 and 201 may not be separated. The connector 250 is displayed to show this inseparable condition. When the connector 250 is displayed between the segments, the segments are prohibited to be moved and copied separately.

The user interface system according to this embodiment provides a system to connect the segments displayed by the segment editor. Consequently, the inconvenience of handling such segments separately is solved.

Figure 18A:
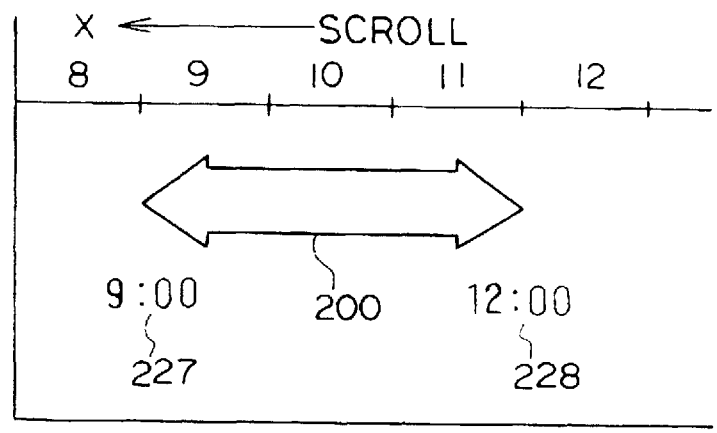
FIG. 18(a)–18(b) show a display procedure of segment data in an embodiment of this invention.
Figure 18B:
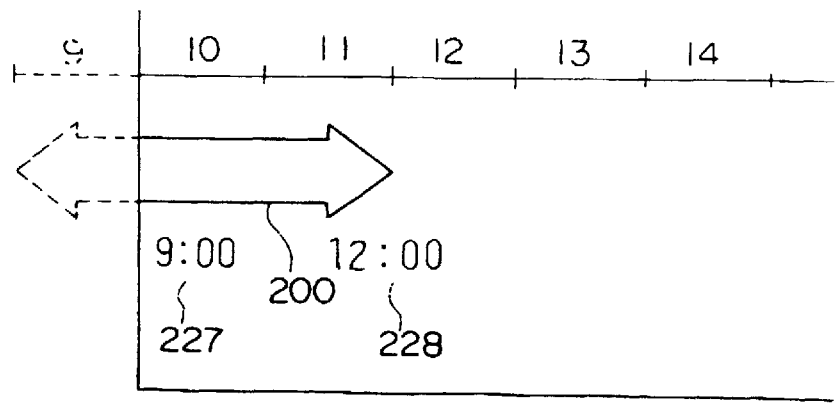

FIG. 18 shows an aspect of the invention which allows an end of a segment to be displayed, when the segment is outside a range of the window. In the FIG. 18 (a), both ends of the segment 200 are displayed. When the display is scrolled as the arrow X shows, the display is changed as shown in FIG. 18(b). In the FIG. 18(b), the left side end of the segment is out of range of display. The field drawn in a dotted line in the FIG. 18(b) is invisible. When the end of the segment becomes invisible due to scrolling, the figure "9:00" 227 is displayed at the edge of the display. By displaying the figure "9:00" which indicates the end of the segment, the end of the segment is notified even if it is invisible.

The figures which notify of invisible ends of the segments may be also displayed, when the ends become invisible due to enlargement of the plot within a window instead of scrolling. In the example of the FIG. 15, when the display scale becomes three times, the right side ends of the segment 200 and the segment 202 are out of the range of the display. Then, the figures "18:30" and "19:50" 228 which show the right side ends of the segments are displayed at the right side edge in the window 301. The invisible right side ends of the segment 200 and the segment 202 are notified by this display of the figures.

The user interface system according to this embodiment provides a system to display a value which indicates the end of the segment in case that the end of the segment is not displayed on the display screen. Consequently, the end of the segment is recognized by comprehending the value.

FIG. 19 illustrates an aspect of the invention which allows for synchronous movement of a window and a segment within a window. After a mouse points out and selects the segment 200 in the window 300, the segment moves according to the movement of the mouse. When the segment 200 moves downwards in the window 300 and the segment crosses the bottom of the window, the window 300 also moves downwards. When the mouse moves further downwards, the window 300 and the segment 200 move downwards synchronously.

In this way, when the mouse is dragged to move the segment to a proper location, the window 300 and the segment 200 move synchronously. This is an example of moving the segment downwards, but the invention also provides for the cases of moving the segments upwards, to the right or to the left.

The user interface system according to this embodiment provides a system to scroll the display along the moving direction of the input unit in case a segment is selected and moved to a different position. Consequently, movement of segments is done easily.

Figure 20:
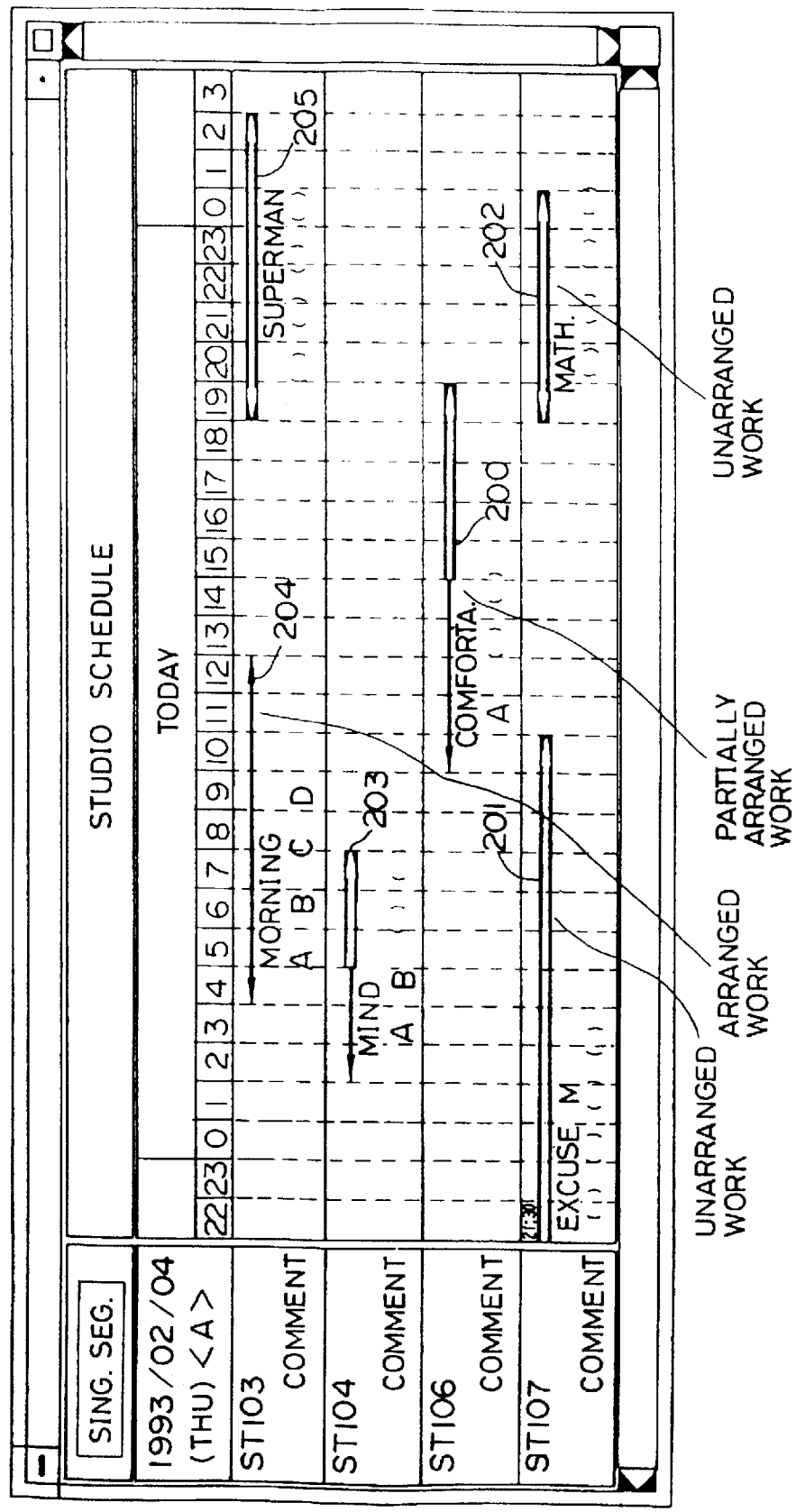
FIG. 20 shows a sample display of segments reflecting the degree of completeness in an embodiment of this invention.
Figure 22B:
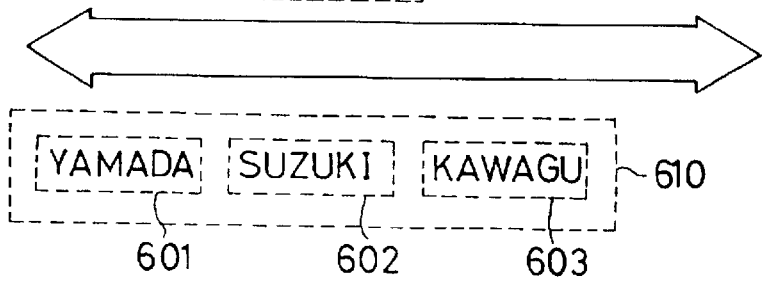
Figure 22C:
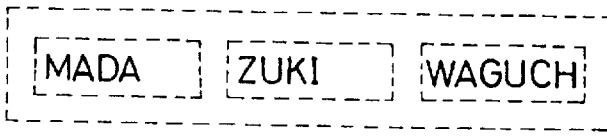
Figure 22D:
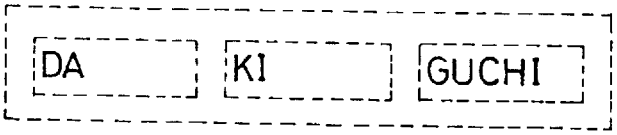
Figure 22E:
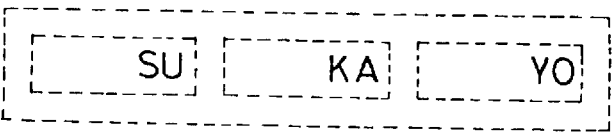
Figure 22F:
Figure 22G:
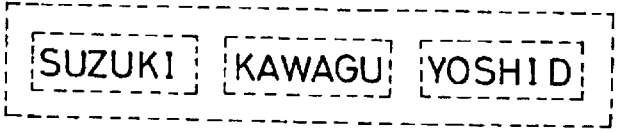
Figure 22H:
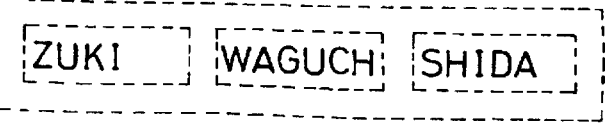

FIG. 20 shows an example of an aspect of the invention which allows for displaying of segments reflecting a degree of completeness of information related to the segments. As in the FIG. 7, the segment detail screen is utilized in order to input information related to the segment.

In the example of the FIG. 7, a worker "YAMADA" in a group having group code 50 is assigned for the program, but two other workers are not arranged. In the FIG. 7, three workers must be delegated from the group code 50, but only one worker is assigned for the program, yet. Two unarranged workers are shown with a man number "Z" and a name "( )" in the FIG. 7. This condition is displayed in the segment 200 in the FIG. 20. In the FIG. 20, the segment 200 displays the condition indicated in the segment detail screen in the FIG. 7; only A of segment 200 (A corresponds to YAMADA of the FIG. 7.) is assigned for this program which requires three workers thus two other workers are not yet provided. When the allotment is incomplete as in this case, a part of the segment 200 is displayed in a reverse display. In this example, the left half of the segment 200 is a normal display and the right half is a reversed display. By displaying the part of the segment in a reversed way, a user is notified that some information related to the segment has not been input and the information is incomplete. When the whole segments are displayed in a reversed way like the segments 201, 202 and 205, no information has yet been provided. When the segment is displayed normally like the segment 204, all the required information has been provided.

In this example, the right half of the segment is reversed to indicate that the allotment is done only partially, even if one worker is missing. However, other kinds of display may be employed to reflect such degree of input. For instance, when one third of the required information is input, one third of the segment may be displayed in a different way from the rest. As in this example, the degree of the missing information related to the segment is easily understood by displaying the segment reflecting such degree visually.

Furthermore, besides the above-mentioned reversed display, a part of the segment may be also displayed in a different color or in a different brightness. This kind of visual display also helps an operator to easily distinguish the segments which need additional information.

The user interface system according to this embodiment provides a system to input additional information for a segment displayed by the segment editor. Consequently, detailed information which cannot be displayed merely by the segment is coped with in case such detailed information exists. Furthermore, since the display of segments reflects the sufficiency of the information, a segment with sufficient information and a segment with insufficient information are recognized visually.

FIG. 21 shows an aspeact of the invention which provides for displaying of information which exceeds a limited display field. FIG. 21(a) shows the information to be displayed, which consists of 14 letters. FIG. 21(b) shows a display field of this example. Only ten letters are displayed in the display field attaching to the segment. Normally, the first ten letters out of the 14 letters are displayed.

When other letters are desired to be displayed, a cursor of a mouse is dragged in a display field 600 and the letters in the display field 600 are scrolled to the left side. FIG. 21(*c*) illustrates the case where the display field has been scrolled by two letters and the 12th letter of the 14 letters is displayed in the display field 600. FIG. 21(*d*) illustrates the case where the display field is scrolled by two more letters and the 14th letter is displayed in the display field 600.

FIG. 22 illustrates an aspect of the invention which provides for displaying multiple information in a limited display field. FIG. 22(*a*) illustrates the information to be displayed; the names of four workers in this example. FIG. 22(*b*) shows the available display fields of this example. The display field 600 is same as the one in the FIG. 21. Display fields 601, 602 and 603 have same functions as the display field 600 respectively Display field 610 treats the display fields 601, 602 and 603 as one display field.

As explained in the example of the FIG. 21, when a cursor of a mouse selects the display field 601 and the mouse is dragged, the six letters of "YAMADA" are scrolled horizontally. "SUZUKI" in the display field 602 and "KAWAGU" in the display field 603 are scrolled in the same way. When the cursor of the mouse selects the display field 610 including the data fields 601, 602 and 603 and the mouse is dragged, the data fields 601, 602 and 603 are scrolled synchronously.

FIG. 22(*c*) shows a display when the display of the FIG. (*b*) has been scrolled to the left side by two letters. FIG. 22(*d*) shows a display when the display of the FIG. 22(*c*) has been scrolled to the left by two more letters. FIG. 22(*e*) shows a display when the display of FIG. (*d*) has been scrolled further to the left. In the FIG. 22 (*e*), the first two letters of the fourth worker, "YO" are displayed in the display field 603. When the display of FIG. 22 (*e*) is scrolled further to the left as in FIG. 22 (*f*) and FIG. 22 (*g*) by two letters, the name of the fourth worker "YOSHIDA" is displayed in the display field 610.

In the above described example, the display fields are created in multiple layers. When a display field in an upper layer is scrolled, a display field in a lower layers are scrolled synchronously.

When the lower display field is scrolled, only the data in the lower display field are scrolled. On the other hand, when the upper display field is scrolled, even the data outside the lower display field are displayed. As a result, four pieces of information may be even displayed in three data fields as in this example.

The user interface system according to this embodiment provides a system to scroll data between the blocks in order to display items of information which are more than the number of blocks in the limited blocks. Consequently, items of information which are more than the number of blocks can be displayed.

FIG. 23 illustrates an aspect of the invention which provides for a batch moving of multiple segments together. In the FIG. 23, segments 200 and 206 are in a normal display, while segments 201 through 205 are in a different display. The segments 201 through 205 illustrate a condition of having been selected by using a mouse.

To select a segment by a mouse, a cursor of the mouse must be placed and clicked at a point in the display field of the segment. When the segments 201 through 205 are consecutively selected by the mouse by repeating this action for five times, the five segments are selected all together. When the mouse is moved and a new location is designated, the selected segments are moved to the new location in the window or in another window.

As described, multiple segments are selected and moved together in this way. Since each segment does not need to be moved respectively, data are moved quickly.

The user interface system according to this embodiment provides a system to move a plurality of segments together. Consequently, movement of a plurality of segments is done easily.

Figures 24A, 24B:
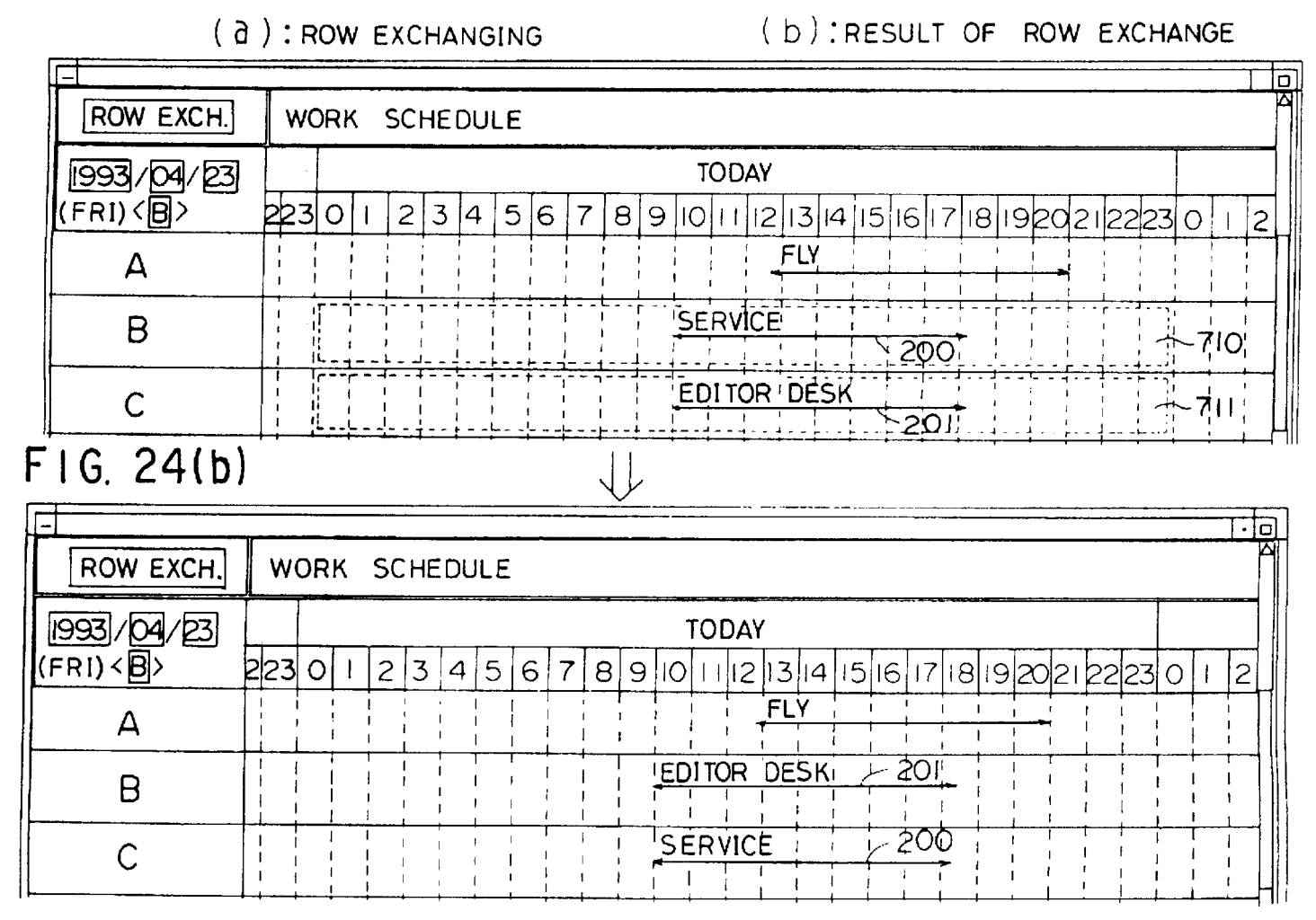

FIG. 24 illustrates another aspect of the invention which provides for exchanging segments. In FIG. 24(*a*), an assignment to worker B and an assignment to worker C replace each other by exchanging the segment of the worker B and the segment of the worker C. In this case, the fields to be exchanged must be selected by a mouse. In FIG. 24(*a*), a field 710 and a field 711 which are drawn as a dotted line are selected. When the rows are exchanged, a segment 200 and a segment 201 are exchanged accordingly as shown in FIG. 24(*b*).

The above described exchange operation enables effective exchange of assignments among workers on a screen. If the exchange operation were not available, a segment must be deleted, another segment must be moved to the deleted location and an additional segment must be created in the location where the segment is removed from. The exchange operation has succeeded in eliminating these steps to delete, move and create in case of exchanging sements.

The user interface system according to this embodiment provides a system to exchange rows in which segments are displayed. Consequently, operation such as deleting and reentering data displayed by the segments is not required.

FIG. 25 illustrates an aspect of the invention which provides for entering information related to a segment. In FIG. 25, when a worker is assigned for a segment 200, candidate workers are displayed. The segment 200 is drawn for the period of 10:00 to 12:30. When a worker is assigned for this work, a group of workers is displayed who are available for the period of 10:00 to 12:30 and additional one hour before and after the period. A window 301 is an input option screen of workers who are searched in the criteria with additional one hour before and after the required period. A worker is selected among the candidates available in the input option screen by using a mouse. In order to input data, input option data are displayed and a mouse selects the data from them. By doing so, data input is done much more efficiently.

The user interface system according to this embodiment provides a system to display a list of candidates, to update information related to the selected segment by a candidate select means. Consequently, entry of information is made by selecting a candidate out of the list and data entry is made easily.

Figure 26:
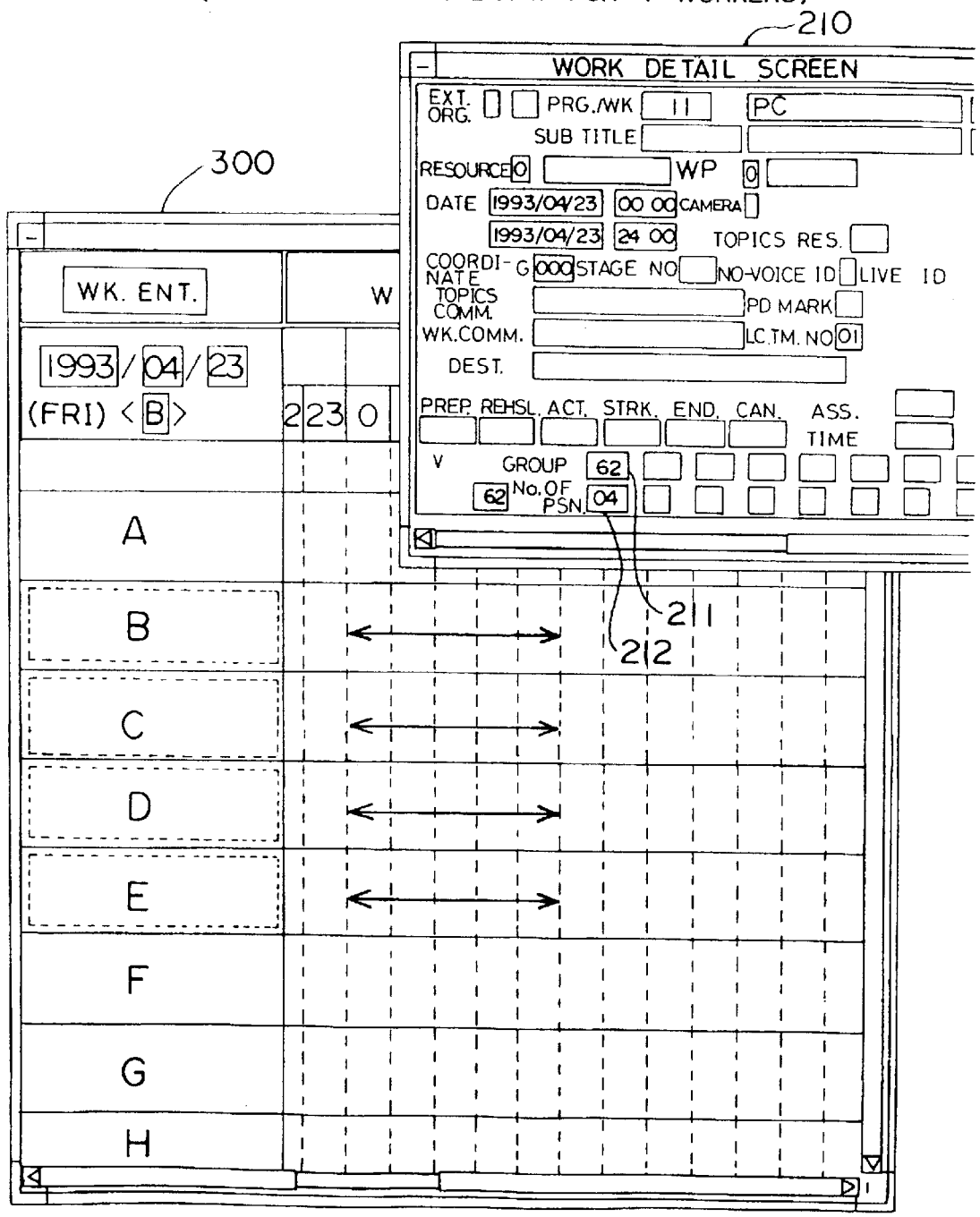
FIG. 26 shows a continuous input of segments in an embodiment of this invention.

FIG. 26 illustrates an aspect of the invention which allows for copying of information to multiple segments. In FIG. 26, a work detail screen 210 shows that group 62 is assigned as a "group in charge" 211 and a "number of required persons" 212 is four for this program called "PC."

For this requirement of assigning four workers, a window 300 is displayed and four workers are selected from the window. For example, a mouse selects workers B, C, D and E. The selected workers are displayed with a frame in a dotted line in order to indicate that they are selected. When this selection of the workers is executed, identical segments reflecting the data in the work detail screen 210 are displayed for the workers B, C, D an E in the window 300. According to this aspect, when a mouse selects multiple locations in advance, the same segment is copied and allotted to the multiple allocations.

The user interface system according to this embodiment provides a system to copy information for a segment together to a different position. Consequently, there is no need to input the same information for multiple segments.

FIG. 27 illustrates an aspect of the invention which provides for entering work data continuously by keeping the work data in a screen. In FIG. 27, a work detail screen 230 is shown. A window 300 shows that a worker B is assigned based on the data in the work detail screen 230. When another work detail screen is displayed and other work data are entered, data which are already displayed in the input field of the work detail screen 230 are kept displayed in the new work detail screen. Consequently, when new work data are input, only the work data which differ from the previous work detail screen are modified. By utilizing the previous input, there is no duplication of effort and time is saved.

The user interface system according to this embodiment provides a system to keep previously edited additional information displayed in a new work detail screen, which allows for continuous editing of the information. Consequently, previously edited information can be used in order to update the information in a new work detail screen.

FIG. 28 illustrates an aspect of the invention which asslows for entering new work continuously. When new work is input continuously, data in the work detail screen 230 are kept displayed and only the work data which differ from the previous detail screen are entered Consequently, thereis no duplication of effort and time is saved.

The user interface system according to this embodiment provides a system to keep displaying previously input information in case that additional information for the segment is to be entered. Since only updating information is entered, the task of entering data is simplified.

Figure 29:
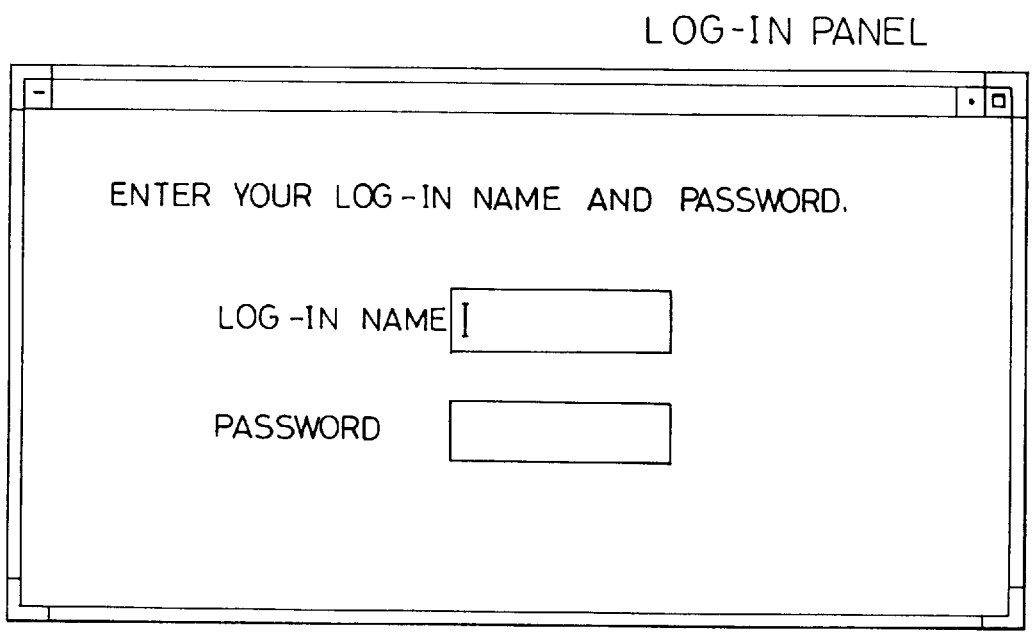
FIG. 29 shows a chart explaining a learning function in an embodiment of this invention.
Figure 30:
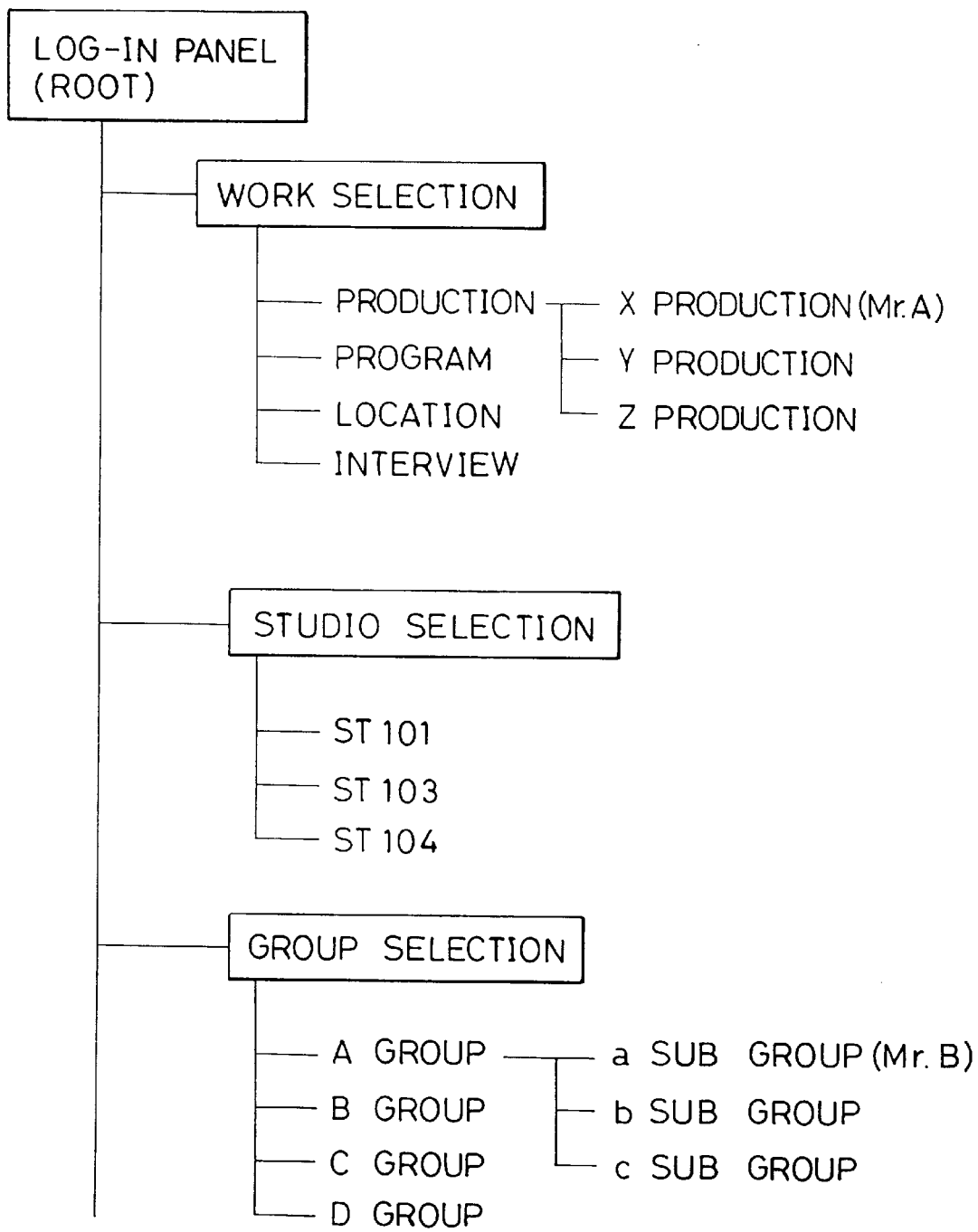
FIG. 30 shows a chart explaining a learning function in an embodiment of this invention.

A learning function in this embodiment is explained hereinafter based on FIG. 29 and FIG. 30. FIG. 29 is a log-in panel displayed on a screen at the work station.

When a log-in name and a password are entered, the work station is set in operation. The system stores this password as an identifier of an operator and learns which path has been taken by the operator in past log in operations. FIG. 30 illustrates a tree structure chart which shows how operation may be proceeded by selecting menus which are displayed after the log-in panel.

For example, after entry of the log-in panel, a selection is made from a "work selection", a "studio selection" and a "group selection" option. If the "work selection" option is chosen, selection may then be made from a pluraliaty of options including "production unit", "program unit", "location unit" and "interview location unit." Then, if the "production unit" is chosen, a selection may be made among "production X", "production Y" and "production Z." For instance, the system learns that Mr. A chooses the "work selection", "the production unit" and "the production X" after the log-in panel. With the learning function, the system displays the data of the "production X" and skips the displays of the work selection menu and the production unit menu as soon as Mr. A enters his password into the log-in panel. This saves the operator time by eliminating the requirement of choosing the work selection and the production unit which otherwise must be made by Mr. A. In the same way, Mr. B chooses the "group selection", "the group A" and a "sub group a" after the log-in panel. Then, the system learns this and displays the data of the "sub group a" by skipping the group selection, the selection of the group A as soon as Mr. B enters his pass-word from the next time.

As described, this learning function has an advantage of offering specific information for a specific person promptly. This function offers a flexible system even to a person who hesitates to use a computer at a work place or to a person who is not used to using a computer.

The user interface system according to this embodiment provides a system which keeps a record of an operation process of a system operator corresponding to an ID such as a password of a system operator and to change the operation process adaptively. Consequently, operation by the system operator is more efficient.

FIG. 31 demonstrates how pop-up menu is displayed according to the invention. In FIG. 31(a), a cursor of a mouse is displayed as an arrow in the window 300. When the mouse button is clicked at this point, a pop-up menu 810 is displayed as illustrated in FIG. 31(b). This pop-up menu 810 is kept displayed on the screen even when the mouse button is released. Conventionally, when the mouse button is released, the pop-up menu has disappeared. However, the pop-up menu is kept displayed in this embodiment, even if the button is released. As a result, there is no need to drag the mouse with the mouse button deporessed, as the button doesn't need to be kept down. In FIG. 31(b), when the mouse is moved downwards with the button released, a selection is made from the pop-up menu. In FIG. 31(c), the cursor of the mouse 800 is moved to point out a desired item in the menu and the mouse button is clicked a second time. As mentioned, a click of the mouse button and a move of the mouse are completely independent. Thus dragging of the mouse, which means moving mouse with the mouse button down is not necessary. Hence, operation has become easy.

The user interface system according to this embodiment provides a system which doesn't require dragging of a mouse in case that a pop-up menu is displayed and an item is to be selected from the menu. In other words, the pop-up menu is displayed by the first click of the button, the pop-up menu is kept displayed without pushing the button down and an item is selected in the pop-up menu by a second click of the button. Since dragging is not necessary, handling of the mouse becomes easy for the system operator.

Figure 31A:
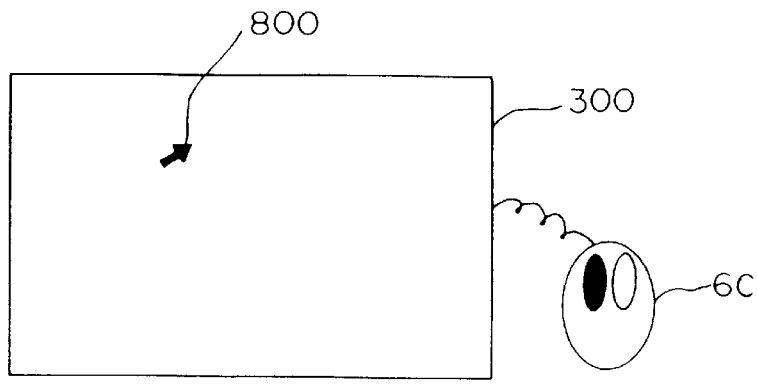
FIG. 31(a)–31(d) show a display procedure of a pop-up menu in an embodiment of this invention.
Figure 31B:
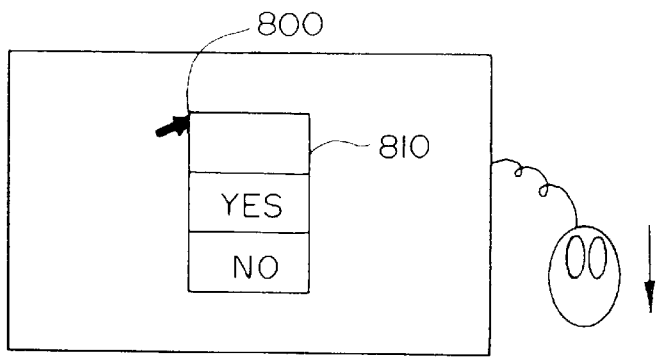
Figure 31C:
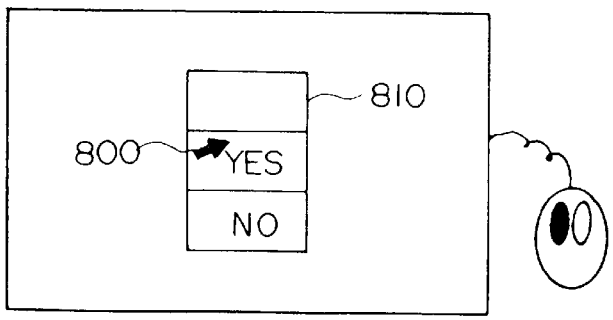

In addition, as illustrated in the FIG. 31(b), the pop-up menu is displayed at the point of the mouse cursor. Normally, a pop-up menu is displayed at a point which doesn't interfere with other displayed data. Therefore, a pop-up menu may be displayed far away from the point of the mouse cursor on a screen. However, in this example, the pop-up menu is displayed at the point of the mouse cursor. As a result, movement of the mouse to select an item from the menu is kept to a minimum and selection from the pop-up menu is done very fast.

Figure 31D:
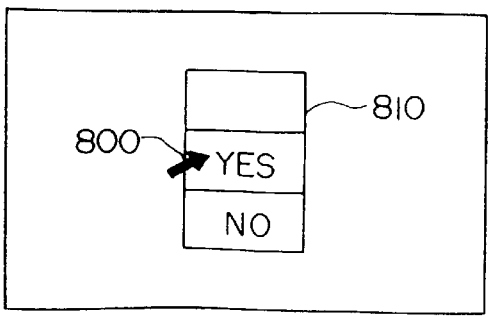

In the FIG. 31(b), the pop-up menu 810 is displayed so that the mouse cursor 800 points at the left top corner of the menu. As illustrated in FIG. 31(d), the pop-up menu may also be displayed so that the mouse cursor 800 points at one of the selection fields of the menu. In the FIG. 31(d), the pop-up menu 810 is displayed so that the cursor points out at a field of "YES." When "YES" is to be chosen, selection is done when only the mouse button is pushed down without moving the mouse at all. When "NO" is to be chosen, the mouse is moved down only in minimum and "NO" is also selected very fast.

The user interface system according to this embodiment provides a system to display a pop-up menu at the cursor position of a mouse. Consequently, a movement of a cursor via the mouse is minimum when a selection of item from the pop-up menu is to be done.

Embodiment 2.

Figure 32:
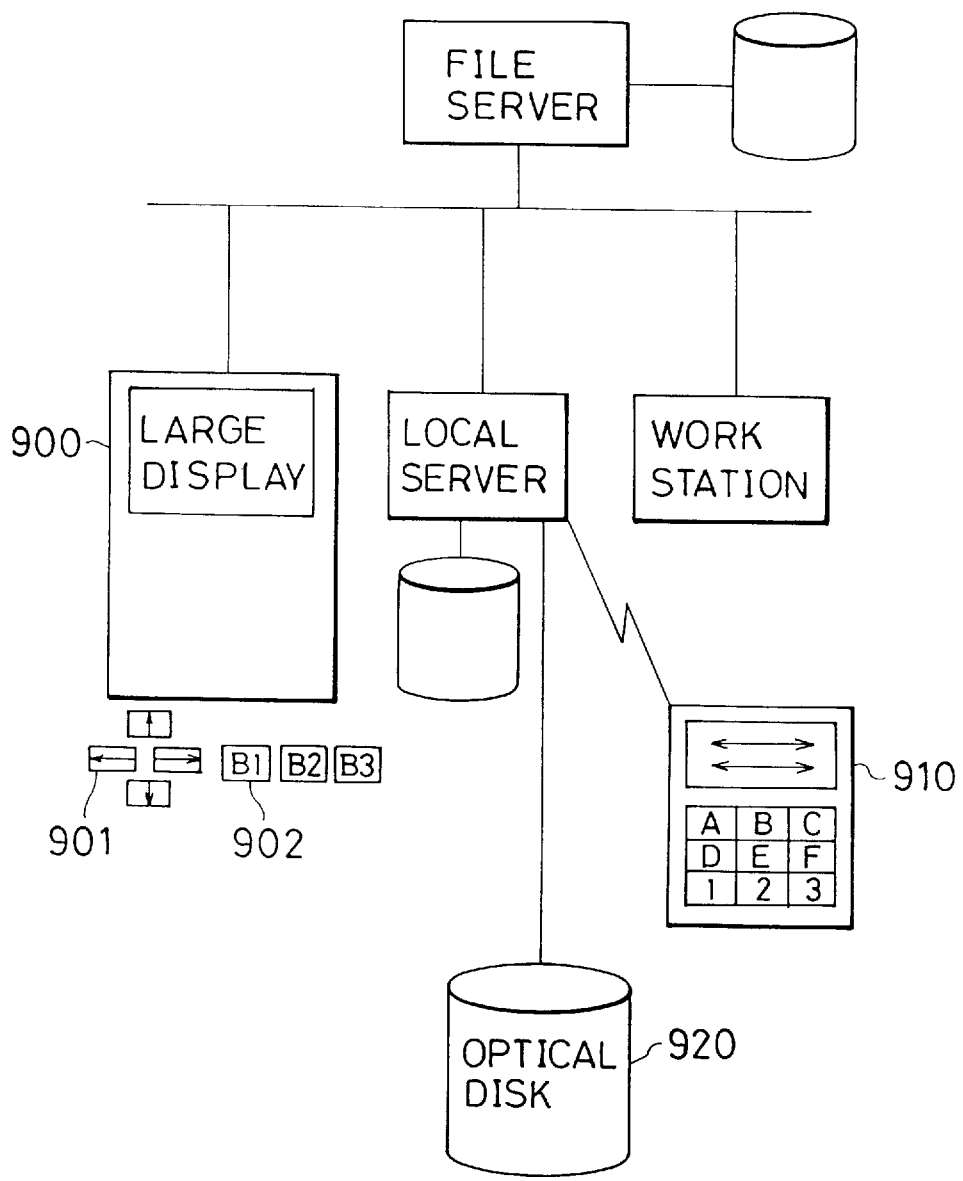
FIG. 32 shows a configuration chart of a large display screen, an electronic schedule pocketbook and an optical disk in an embodiment of this invention.

Another embodiment of this invention is explained hereinafter. In FIG. 32, a 37 inch large display screen 900 is installed in the system. A direction key 901 and a mouse button 902 are coupled to the large display screen 900. The direction key 901 and the mouse button 902 consist of a foot-mouse which is operated by a foot. The large display screen 900 displays the same data which is displayed by the work station. The direction key 901 and the mouse button 902 have the same role as the mouse of the work station.

Figure 34:
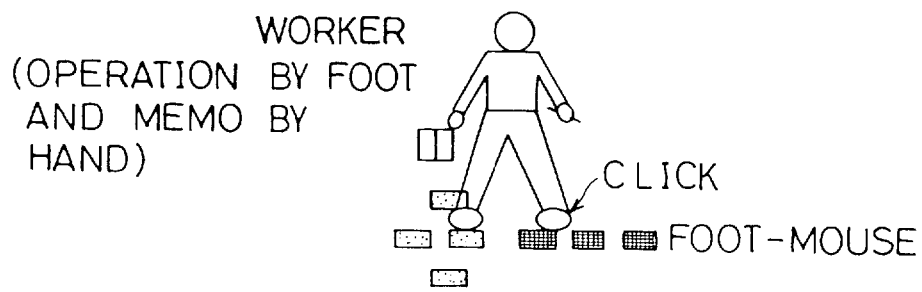
FIG. 34 shows an operation of a large display screen by a foot-mouse in an embodiment of this invention.

FIG. 33 shows a sample display displayed at the large display 900. The large display shows a one week schedule of a worker "YAMADA KAZUO." Selection of a person, the date and the hours is done by the foot-mouse. FIG. 34 demonstrates how a user operates the large display by the foot-mouse. The foot-mouse is employed so that the user's hands are free for such tasks as writing down the user's own schedule while operating the system by foot. The large display is also installed at a work place and a worker might need to be able to operate the large display while holding resources and equipment in the user's hands. The foot-mouse enables a worker who is holding such resources and equipment to operate the large display.

The segment s, as described above, are also used i n the large display 900 as shown in FIG. 33. This segment display helps the workers and technicians at a work place t o see their own schedule visually. The display of segments is done by an existing function of the work station and an additional program is not needed to display the segments for the large display. When the large display is connected to the network, the display is able to show the same display as the work station.

In this example, the foot-mouse has four direction keys. Alternatively, the foot-mouse may have only one key and it may be stepped down in four directions to move the cursor in four directions. A track ball may also be used instead of a foot mouse.

The user interface system according to this embodiment provides a system to select and display information by a system operator's foot. Consequently, information can be displayed on the display screen even if the system operator is holding a package and operates the system with a foot and may be used in a work place, a hall, etc. Furthermore, the displayed information is written down easily, when the user's hands are free.

Embodiment 3.

Another embodiment of this invention is explained hereinafter based on FIG. 32. An electronic schedule pocketbook 910 is tied into the system for use by a worker or a technician at a remote location.

For example, a worker or a technician connects his electronic schedule pocketbook 910 to a local server or to a file server on line, whenever necessary. By doing so, his schedule is downloaded to his electronic schedule pocketbook. Furthermore, he may also enter his requests in his electronic schedule pocketbook and send them to the local server or the file server. By sending such information, a user of the system may construct a flexible system which reflects the worker's requests on work schedules.

Embodiment 4.

Figure 35:
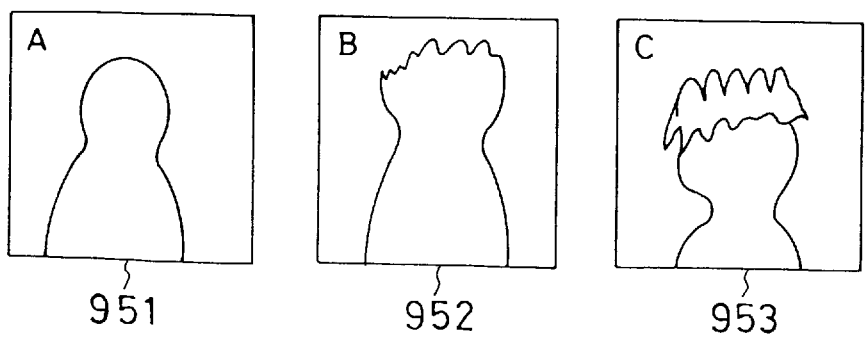
FIG. 35 shows a display of image data in an optical disk in an embodiment of this invention.

Another embodiment of this invention is explained hereinafter based on FIG. 32. Optical disk 920 is coupled to the system for storing image data of resources. In the above described embodiments, input data are displayed in letters, figures and segments. However, in this embodiment, photographs of resources may also be stored in the optical disk 920 and displayed when requested by an operator. FIG. 35 demonstrates how photograph images stored in the optical disk 920 are actually utilized. In the FIG. 35, a candidate table 950 displays available candidates in a window as described in earlier embodiments. The candidate table 950 displays worker's name, sex, age, etc. A most suitable worker may be selected from the candidates, but sometimes a user of the system has a difficulty to recognize an actual person from the displayed table. In that case, a photograph image stored in the opotical disk 920 may be displayed. For example, when the mouse selects worker A, B and C, photograph images 951, 952 and 953 are displayed. The photograph images help the user to choose a worker. Furthermore, the photograph image may be a motion picture instead of a still picture. For example, ten seconds motion picture may be played to show a worker's attitudes and actions.

The user interface system according to this embodiment provides a system to store image data of resources in order to control the resources. The image data are displayed in case that an actual resource may not be specified by the ID data such as normal character data or in order to confirm the actual resource. Consequently, a selection of resources is made adaptively and correctly.

In addition to the above mentioned still picture and motion picture, voice data may be also used. When the photograph image 951 is displayed, the voice recording of the displayed worker may be played together for ten seconds. The user is able to hear the worker's voice. When a motion picture is displayed, voice may also accompany the screen. The voice may also be used alone without displaying motion or still pictures.

The user interface system according to this embodiment provides a system to use voice data instead of the image data. By using the voice data instead of the image data or using the voice data together with the image data, a suitable resource may be selected.

To addition, when the list of possible resources in the candidate table are not human beings, but instead are things like goods for rent and goods on lease, either still picture or motion picture of the things are illustrated the same way as in the case of human being.

In case of goods for rent and goods on lease, size, scale, characteristics of the things are acknowledged by the image. This helps the user to check if the goods for rent or lease match the environment of the work place. For example, when a crane car is to be used between the buildings and the space between the buildings is narrow and limited, a slim crane car must be picked. In this case, a photograph image of crane cars will help the user to select a right one. When the candidates table displays the crane cars only in writing, it is hard to imagine the actual crane cars. The photograph images play an important role to assist the user in the selection process.

Embodiment 5.

In the before-mentioned embodiments, segments are used to input, edit and display information. However, symbols which show a position and a length may be used instead of the segments. In the previous embodiment, arrows are drawn at the both ends of the segments. However, the arrow may be drawn only at one end and the arrow may be also omitted completely. Symbols like ( ) or Δ, etc. may also be drawn on a segment to display that some special information is existing.

What is claimed is:

1. A user interface system, for entering data into a database, which has a display screen for displaying information including a time schedule for at least one resource and an input unit for inputting data, the user interface system comprising:

input means for designating a first position and a second position on the display screen relative to the time schedule with the input unit;

a segment editor for creating and displaying a segment, having two ends, on the display screen between the first position and the second position; and database entry means for storing data into the database corresponding to the displayed segment, for selecting the segment with the input unit, for receiving additional information regarding the selected segment and the at least one resource inputted with the input unit, and for storing the additional information in the database.

2. The user interface system of the claim 1, wherein the segment editor includes segment edit means for editing the displayed segment to change at least one of the two ends, and wherein the database entry means includes database maintenance means, receiving changes to the displayed segment from the segment editor, for updating data stored in the database to reflect the editing by the segment edit means.

3. The user interface system of the claim 2, wherein the database entry means stores data corresponding to the times of the two ends of the segment into the database.

4. The user interface system of the claim 3, wherein the segment editor further includes resource display means for displaying the at least one resource, scale means for displaying a scale for scheduling of the resource, and wherein the input means assigns a section to the resource corresponding to a portion of the display between the first position and second position, the segment editor displays the segment as the section of the resource, and the database entry means stores the scheduled section of the resource.

5. The user interface system of the claim 4, wherein the segment editor includes value display means for displaying values, which correspond to the ends of the segment, at the ends of the displayed segment.

6. The user interface system of the claim 5, wherein the value display means displays the value corresponding to the end of the segment even when the end of the segment is not displayed on the display screen.

7. The user interface system of the claim 4, wherein the database entry means further comprises:

selecting means for selecting the displayed segment with the input unit;

window means for displaying a data entry window which has an entry field for entering additional information; and entry means for entering the additional information into the entry field.

8. The user interface system of the claim 7, wherein the entry means comprises candidate select means for displaying a list of possible candidates to be entered in the entry field, and for selecting a candidate from the list.

9. The system of the claim 7, wherein the segment editor includes duplicating means for duplicating the segment and for placing a duplicated segment at another position relative to the time schedule and the database maintenance means includes copy means for storing data in the database corresponding to the duplicated segment and for copying the additional information in the database corresponding to the segment and for storing the copied additional information for the duplicated segment.

10. The user interface system of the claim 7, wherein the entry means includes default means for displaying a previously entered information in the entry field as a default.

11. The user interface system of the claim 7, wherein the database entry means provides an editing window having an edit field, displays information in the edit field and allows for editing of the information displayed in the edit field.

12. The user interface system of the claim 7, wherein the segment editor includes information display means for displaying a portion of the additional information along the displayed segment.

13. The user interface system of the claim 12, wherein the segment editor includes style means for displaying the segment in a different style to reflect a sufficiency of the information needed for the segment.

14. The user interface system of the claim 13, wherein the resource is selected from a list of a place, an equipment and a human.

15. The user interface system of the claim 4, wherein the segment editor includes check means for checking that the section is consistent with a schedule of the resource already stored in the database, and for prohibiting display of the segment and entry of the data into the database when there is an inconsistency between the section assigned and the schedule already stored.

16. The user interface system of the claim 2, wherein the segment editor includes display control means for distinguishably displaying segments when the segments are at least partially overlapped on the display screen with respect to each other.

17. The user interface system of the claim 16, wherein the display control means includes color display means for displaying the segment in color, and color change means for changing the color of the segment to distinguish the segments.

18. The user interface system of the claim 16, wherein the display control means includes position change means for changing a position of the segments to distinguish the segments.

19. The user interface system of the claim 18, wherein the position change means includes shift display means for shifting the position of the segment to distinguish the two ends of the segment.

20. The user interface system of the claim 19, wherein the position change means includes divisional display means for providing a plurality of divisional areas on the screen and for displaying at least a portion of each segment within at least one of the divisional areas.

21. The user interface system of the claim 2, wherein the segment editor includes connector display means for displaying a connector for coupling the ends of a plurality of related segments so that the segment edit means does not edit the related segments.

22. The user interface system of the claim 1, wherein the segment editor includes moving means for selecting and moving the segment in a desired direction, with the input unit, detect means for detecting the direction of the movement of the segment, and scroll means for scrolling the information along the moving direction.

23. The user interface system of the claim 1, wherein the segment editor includes:

(a) display means for providing a plurality of areas on the display screen and displaying a segment in each of the provided areas; and (b) exchange means for exchanging the segment displayed in one area with the segment displayed in another area.

24. The user interface system of the claim 1, wherein:

The input unit includes foot operation means for operating the input unit with a foot of an operator; and wherein the display screen includes means for displaying information provided by the input unit.

25. The user interface system of the claim 1, wherein the segment editor includes multi-moving means for designating a plurality of segments and synchronously moving the designated segments together to other positions.

26. A resource scheduling method for scheduling a resource, comprising the steps of:
(a) displaying the resource and a time scale on a display screen;
(b) designating on the display screen a first position and a second position relative to the time scale, the first and second positions, respectively, representing start and end points on the time scale for indicating a period of time assigned to the resource;
(c) creating and displaying on the display screen, a segment having two ends, the segment being located between the designated first and second positions;
(d) storing the resource and the start and end points as an assigned schedule; and
(e) receiving additional information relating to the resource and the start and end points so as to complete the scheduling of the resource.

* * * * *